(12) United States Patent
Sabie et al.

(10) Patent No.: US 11,084,577 B2
(45) Date of Patent: Aug. 10, 2021

(54) AIRCRAFT WITH VERTICAL TAKEOFF AND LANDING AND ITS OPERATING PROCESS

(71) Applicants: Răzvan Sabie, Bucharest (RO); Iosif Țăposu, Bucharest (RO)

(72) Inventors: Răzvan Sabie, Bucharest (RO); Iosif Țăposu, Bucharest (RO)

( * ) Notice: Subject to any disclaimer, the term of this patent is extended or adjusted under 35 U.S.C. 154(b) by 384 days.

(21) Appl. No.: 16/062,787

(22) PCT Filed: Dec. 16, 2016

(86) PCT No.: PCT/RO2016/000026
§ 371 (c)(1),
(2) Date: Jun. 15, 2018

(87) PCT Pub. No.: WO2017/105266
PCT Pub. Date: Jun. 22, 2017

(65) Prior Publication Data
US 2020/0331601 A1    Oct. 22, 2020

(30) Foreign Application Priority Data

Dec. 18, 2015 (RO) ............................. RO201501021

(51) Int. Cl.
*B64C 29/00* (2006.01)
*B64C 27/20* (2006.01)
*B64C 15/02* (2006.01)
*B64C 27/24* (2006.01)
(Continued)

(52) U.S. Cl.
CPC .......... *B64C 29/0025* (2013.01); *B64C 15/02* (2013.01); *B64C 27/20* (2013.01);
(Continued)

(58) Field of Classification Search
CPC .......... B64C 29/0025; B64C 2201/027; B64C 2201/162; B64C 2201/167; B64C 27/20; B64C 39/001
See application file for complete search history.

(56) References Cited

U.S. PATENT DOCUMENTS 3,752,419 A * 8/1973 Richter ............... B64C 29/0066
244/23 C
3,933,325 A * 1/1976 Kaelin .................. B64C 39/001
244/23 C
(Continued)

FOREIGN PATENT DOCUMENTS

DE        2445495 A1     3/1975
DE     19630026 A1 *    1/1998  ........... B64C 39/001
(Continued)

OTHER PUBLICATIONS

Search Report Issued in connection with Romanian Application No. 201501021 dated Dec. 8, 2016.
(Continued)

*Primary Examiner* — Philip J Bonzell
*Assistant Examiner* — Tye William Abell
(74) *Attorney, Agent, or Firm* — Steven M. Shape; Dennemeyer & Associates, LLC

(57) ABSTRACT

The invention relates to an aircraft with vertical takeoff and landing and its operation method. Aircraft with vertical takeoff and landing of aerodyne type according to the invention comprises a circular symmetrical aerodynamic body (1) having an internal stiffening platform (2) located on the chord of the aerodynamic profile and which supports the components of the aircraft, at least four vertical ducted propellers (3a), (3b), (3c), (3d) arranged symmetrically to the central vertical axis of the carrier body (1), but also to the predetermined flight axis and to the transverse axis of the carrier body (1), propellers (3a) and (3c) having the same
(Continued)

rotational direction opposite to that of propellers (3*b*) and (3*d*) at least two horizontal ducted propellers (4) with opposite rotation directions located inside the carrier body or outside of it, placed parallel symmetrical with the predetermined flight axis and on both sides of it, vector nozzles (5), one for each horizontal propeller (4), which provides vector orientation to jets of the horizontal ducted propellers (4), the means of power supply (6), which are designed to provide electricity necessary to operate all engines and all electrical and electronic devices on board, an electronic control and management flight module (7) and a landing gear (9), which aims to promote contact between the aircraft and the ground.

18 Claims, 22 Drawing Sheets

(51) Int. Cl.
  *B64C 27/82* (2006.01)
  *B64C 39/00* (2006.01)
(52) U.S. Cl.
  CPC .............. *B64C 27/24* (2013.01); *B64C 27/82* (2013.01); *B64C 39/001* (2013.01); *B64C 2201/027* (2013.01); *B64C 2201/14* (2013.01); *B64C 2201/162* (2013.01); *B64C 2201/167* (2013.01); *B64C 2201/185* (2013.01)

(56) References Cited

U.S. PATENT DOCUMENTS

| | | | | |
|---|---|---|---|---|
| 4,023,751 A | * | 5/1977 | Richard | B64C 39/001 |
| | | | | 244/23 C |
| 4,214,720 A | * | 7/1980 | DeSautel | B64C 39/001 |
| | | | | 244/12.2 |
| 4,457,476 A | * | 7/1984 | Andresevitz | B64C 29/00 |
| | | | | 244/23 C |
| 5,178,344 A | * | 1/1993 | Dlouhy | B64C 27/20 |
| | | | | 244/12.2 |
| 2006/0144994 A1 | | 7/2006 | Spirov et al. | |
| 2015/0034672 A1 | | 2/2015 | Wettergreen | |

FOREIGN PATENT DOCUMENTS

| | | | | |
|---|---|---|---|---|
| DE | 19630026 A1 | | 1/1998 | |
| GB | 898358 A | * | 6/1962 | ........... B64C 39/001 |
| GB | 898358 A | | 6/1962 | |
| GB | 2277668 A | | 11/1995 | |
| RO | 201501021 | | 12/2015 | |

OTHER PUBLICATIONS

International Search Report issued in connection with PCT Application No. PCT/RO2016/000026 dated May 5, 2017.

C. Berbente, S. Danaila, "On the Aerodynamic Characteristics of a Class, of Airfoils With Continuous Curvature at Subsonic, Transonic and Supersonic Regimes", U.P.B. Sci. Bull., Series D, vol. 69, No. 1, 2007 ISSN 1454-2358.

Iosif Taposu, "About the Low Drag of Dolphin Profiles at Supersonic Speeds," ICRAT Conference in Belgrade, Jun. 2006.

Iosif Taposu, "Dolphin Profiles—a New Concept in Aerodynamics", Editura Temmica, 2002.

* cited by examiner

Aerodynamic profile – state of art air circuit in flight cruise regimen
air circuit in static sustentation regimen

AIRCRAFT WITH VERTICAL TAKEOFF AND LANDING AND ITS OPERATING PROCESS

CROSS-REFERENCE TO RELATED APPLICATIONS

This is a 35 U.S.C. 371 National Stage Patent Application of International Application No. PCT/RO2016/000026, filed Dec. 16, 2016, which claims priority to Romanian application 201501021, filed Dec. 18, 2015, each of which is hereby incorporated by reference in its entirety.

The invention relates to an aircraft with vertical takeoff and landing capabilities and its operating method.

There are several procedures and aircrafts with vertical takeoff and landing capabilities which are already known.

It is known, for example, document US 2003/0098388 A1 disclosing a vertical takeoff and landing apparatus showing the drive means in the vertical direction and propulsion means in the horizontal direction.

It is also known from patent application DE 24 45495 A1 an aircraft of aerodyne type with vertical takeoff and landing, having an aerodynamic symmetrical circular bearing body; at least four vertical intubated propellers arranged symmetrically to the central vertical axis of the bearing body and also to the predetermined flight axis and to the transverse axis of the bearing body, two of the vertical propellers having the same direction of rotation, opposite to the other two vertical; at least two horizontal intubated propellers with opposite rotation directions, symmetrically parallel placed to the predetermined flight axis and on either side of it and a landing gear (9), which aims to promote contact between aircraft and ground.

Known processes and aircrafts with vertical takeoff and landing capabilities generally have the following disadvantages:
  high energy consumption or fuel during flight, leading to limited autonomy;
  helicopter and UAV multiple rotors devices, the flight is conducted via a thrust I weight ratio higher than one;
  cruising speeds are low;
  the room for maneuver is limited;
  aircraft with vertical takeoff have very low maneuver capabilities during takeoff and landing;
  aircraft with vertical takeoff achieve the transition from the vertical to the horizontal flight with difficulty;
  loads are relatively small.

Also it is known from patent R0110221 a bearing aerodynamic profile that can be used in the aerospace industry.

It is disclosed in R0110221, the content of which is incorporated by reference herein, an aerodynamic profile according to claims 1-3 of said patent that are also incorporated herein by reference, profile that defines itself, in short, by an arbitrary frame $s(x)$ in a unit chord $[O, 1]$ and a positive differentiable function $g(x)$ in said the range, which represents the half-thickness of the profile, meeting the aerodynamic profile in any vertical section following two conditions:
  i) semi-thickness is tangential to the skeleton in the leading edges and run
  ii) the profile is bidirectional, that is symmetrical about the axis perpendicular on the middle of the chord, i.e. $s(x)=s(1-x)$ and $g(x)=g(1-x)$.

The invention eliminates many of the mentioned drawbacks allowing the possibility of achieving an aircraft with vertical takeoff and landing capabilities, simple, economical, fast, and maneuverable, with a smooth transition from vertical to horizontal flight and with greater flight autonomy.

The invention solves many of the drawbacks of the prior art by providing an aircraft and a method of operating thereof according to the independent claims and the dependent claims thereto.

More specifically, in a first aspect, the invention provides an aircraft with vertical takeoff and landing which consists of a circular symmetrical, bearing, aerodynamic body, having an internal stiffening platform located on the chord of the aerodynamic profile and supporting the components of the aircraft; at least four intubated vertical propellers symmetrical to the central axis of the bearing body sound, as well as to the preset flight axis and the horizontal axis cross-body carrier, the opposing propellers having the same rotational direction and the adjoining opposite; at least two intubated horizontal propellers with opposite rotation directions, having opposite rotation directions, symmetrically parallel placed to the predetermined flight axis and on either side of it; vector nozzles, one for each horizontal propeller, which provides the vector orientation to the jets of the intubated horizontal propellers; means of power supply, which are designed to provide the necessary electricity to operate all engines and electrical and electronic devices on board; an electronic control and management of flight module and a landing gear, which aims to promote contact between aircraft and ground.

A preferred embodiment of the present invention is represented by an aircraft having the shape of the aerodynamic profile defined in the patent R0110221.

The aircraft according to the invention can fly lifting three lifting modes, namely:
  the flight in lifting mode produced by the intubated vertical propellers this lifting type being characteristic of the landing and takeoff phases of the device, and its thrust I weight ratio is higher than 0
  the flight in dynamic lifting mode produced by intubated horizontal propellers flight during which the machine is kept in the air due to the bearing force resulting from its moves through the air and the thrust I weight ratio is below one;
  flying under the joint lifting mode obtained using both intubated vertical propellers as well as the intubated horizontal propellers, this regime being characteristic for the transition from takeoff to cruise and from the cruising stage to landing, and the thrust I weight ratio of the device is variable, going from high values to low values and vice versa.

In a second aspect, the invention describes a method of operating the aircraft according to the invention which encompasses the description of the takeoff, landing and flight booked cruise stages, the description of the maneuvers needed to perform these steps and the description of other maneuvers that the flying device is capable of.

Other characteristics of the aircraft and its operating procedure, in accordance with the present invention are subject of the dependent claims appended hereto.

The aircraft with vertical takeoff and landing according to the invention has the following advantages:
  it takes off and lands vertically;
  in cruising mode the aircraft flies with a thrust I weight ratio below one like the airplanes;
  it presents a low fuel consumption thanks to the hybrid propelling drive (for versions equipped with this system);
  it has maneuver capabilities superior to all known aircrafts;

it has very good flight characteristics in all flight modes (subsonic, transonic and supersonic);

it has low manufacturing costs due to the concept of symmetry;

it is lightweight and does not need control surfaces and aerodynamic control;

it has a high reliability in operation;

it has increased safety operation.

The aircraft can have multiple uses in piloted versions or unmanned (UAV) unit personnel flight, passenger transport, air travel, air taxi, aerial surveillance, mapping, rapid delivery of materials, military applications with piloted devices or UAV, aircraft for suborbital flight, etc.

These and other features of the present invention will become clear from the following description of some embodiments which are not intended to limit the invention, wherein FIGS. 1-41 are:

Embodiments of the invention will be described below with reference to the drawings.

Figure 1:
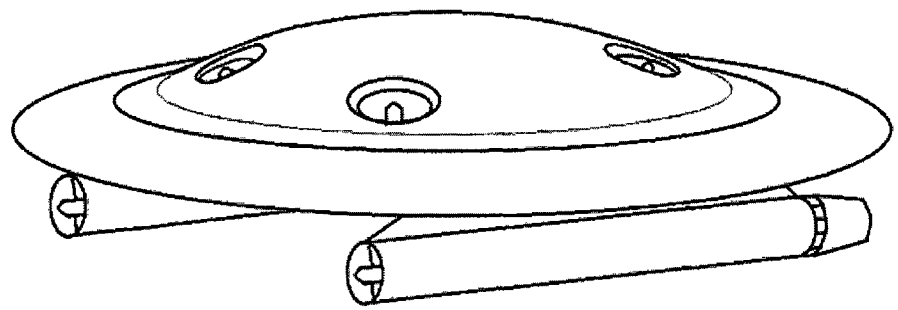
FIG. 1 is a general view of the apparatus according to the invention in the embodiment with flat soffit and the outer horizontal propulsion engines.
Figure 2:
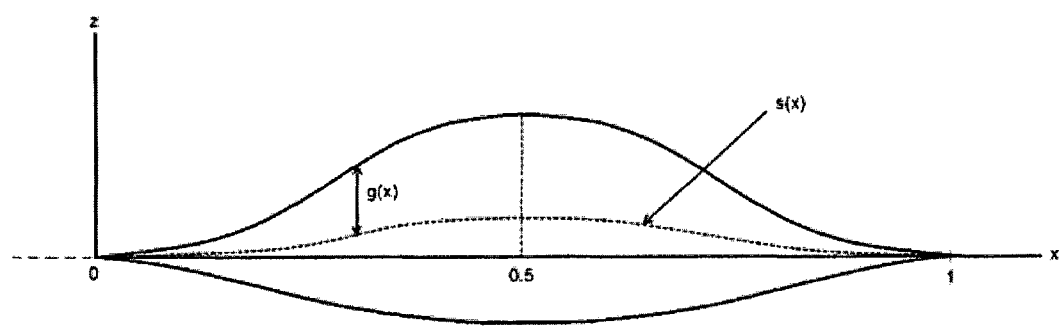
FIG. 2 is known in the art (R0110221) and it represents a two-way/bidirectional aerodynamic profile.

The aircraft with takeoff and landing according to the invention is shown in an overview in FIG. 1. FIG. 2 shows the aerodynamic profile described in the patent RO 110221 according to the current state of the art.

Figure 3:
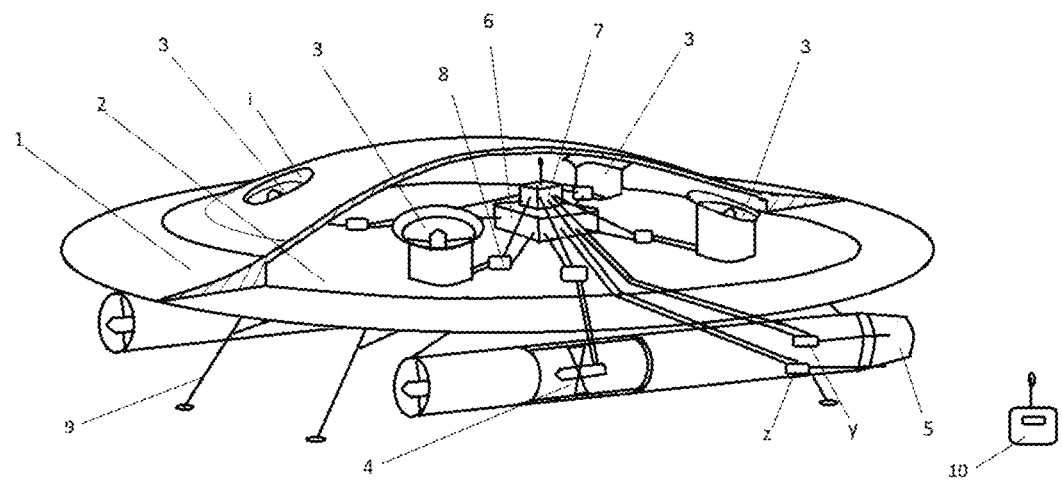
FIG. 3 is a view of the apparatus shown with the main section along the flight axis and a second section through one of the horizontal thrusters.

In FIG. 3 it is shown with a main section along the flight axis and a secondary section in one of the horizontal thrusters. The aircraft comprises a circular bearing body 1 with an aerodynamic bidirectional profile, an inner platform 2 placed on the chord of the bidirectional profile, at least four vertical intubated propellers ("ducted fans") three symmetrically arranged from the center of the bearing body 1, to the flight axis of the aircraft and from its horizontal transverse axis, four horizontal intubated propellers, which are placed with opposite rotation directions, symmetrically parallel placed to the predetermined flight axis and on either side of it; two vector nozzles 5 that can be directed three-dimensional, one for each of the horizontal intubated propellers, each of the two nozzles being operated by means of two actuators y and z, one of which y carrying out the horizontal movement, and the other z the vertical movement of the nozzle, a group of electric accumulators 6, a flight management and control electronic module 7, six speed governors 8, each one serving an intubated propeller and a landing gear 9. The aircraft with vertical takeoff and landing, in its unmanned version can be controlled from the ground using a remote radio control 10 or in its pilot version can be piloted with the means on board.

The bearing body 1 having both the role of wing, as well as of fuselage has a circular symmetric shape and aims mainly, after reaching a certain horizontal speed of the aircraft, at ensuring its aerodynamic carrying capacity. The profile of the bearing body in FIG. 2 belongs to the family of aerodynamic profiles disclosed in R0110221 patent and is defined by an arbitrary frame s(x) on an unit chord [0.1] and a positive and differentiable function g(x) over the mentioned interval, which is the half-thickness of the profile, meeting the following two conditions in any vertical section:

i) semi-thickness is tangential to the skeleton in the leading and run edges:

ii) the profile is bidirectional, that is symmetrical about the axis perpendicular to the middle of the string, i.e. s (x)=s(1−x) and g (x)=g(1−x).

The bearing body 1 is provided with profiled openings i, both on the outside and on the inside, which provide both air inlet to the vertical intubated propellers 3 and the ejection thereof. On the underside of the carrying body 1 the two horizontal intubated propellers 4 are placed parallel symmetrically to the predetermined flight axis, but according to the chosen aerodynamic profile, they may be placed inside the bearing body 1 as well.

Inside the bearing body 1 on its chord it is the inner platform 2. This is placed on the chord of the aerodynamic profile and is designed to provide the necessary support for mounting the components of the unit and to confer stiffness to it. Thus, on the inner platform 2 is placed the group of electric accumulators 6, the electronic flight module 7, speed governors 8 as well as fixings for vertical intubated propellers 3. For the good balance of the aircraft, the electronic flight module 7 as well as the group of electric accumulators 6 will be placed and grouped symmetrically around the vertical axis of the apparatus, namely the inner platform 2. If the profile of the underside of the bearing body is flat, the inside of the soffit constitutes the inner platform 2.

Figure 4:
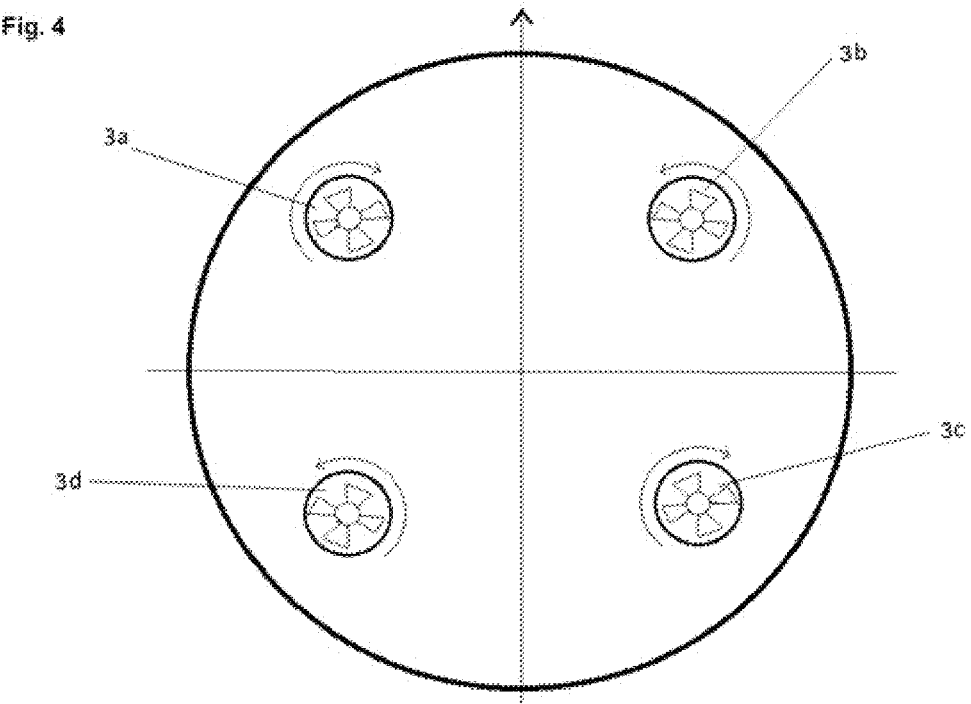
FIG. 4 is a top view of the arrangement of the intubated propellers vertical to the flight axis and the transverse and the directions of rotation thereof.

The vertical intubated propellers 3 known as the streamlined propellers or "ducted fans" are arranged symmetrically to the vertical central axis of the of the bearing body 1 and symmetrically to the flight axis and to the transverse axis, perpendicular to the flight and through the center of the bearing body 1—FIG. 4.

Figure 5:
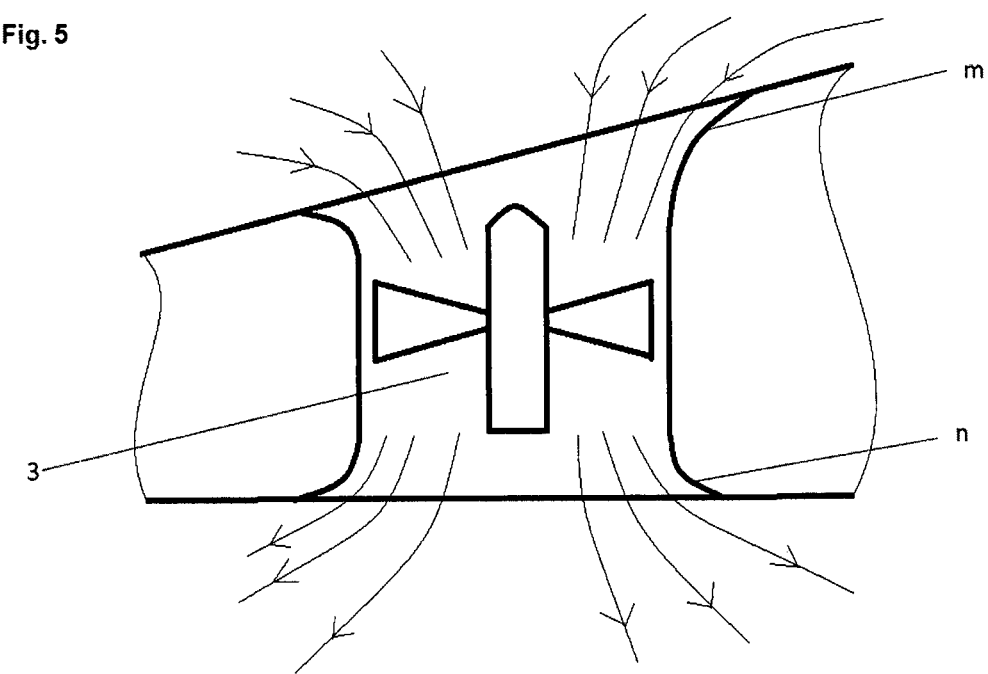
FIG. 5 is a section through a vertical intubated propeller.

The rotation directions of the vertical intubated propellers 3 and their location are similar to that of quadcopters "X type, the rotation direction of the propellers 3a and 3c being the same and opposite to that of propellers 3b and 3; and the lines joining the intubated propellers 3a and 3c, respectively the 3b and 3d intubated propellers, intersect at the center of symmetry of the bearing body 1. The vertical intubated propellers 3 are made of a tube which streamlines the assembly formed by the propeller itself and the electric motor which drives the propeller—FIG. 5. The vertical intubated propellers 3 are placed as far away from the axes of the bearing body 1 and as close as possible to its edges, but still so that they remain streamlined entirely into the structure of body 1 not to generate significant turbulence and thus affect less the area available to generate buoyancy. Vertical propellers 3 are driven by electric motors, but in certain embodiments the heat engines with piston or the engines of Wankel type can also be used, or in some embodiments we can even use turbo jets to override the unit electric motor-propeller.

Figure 6:
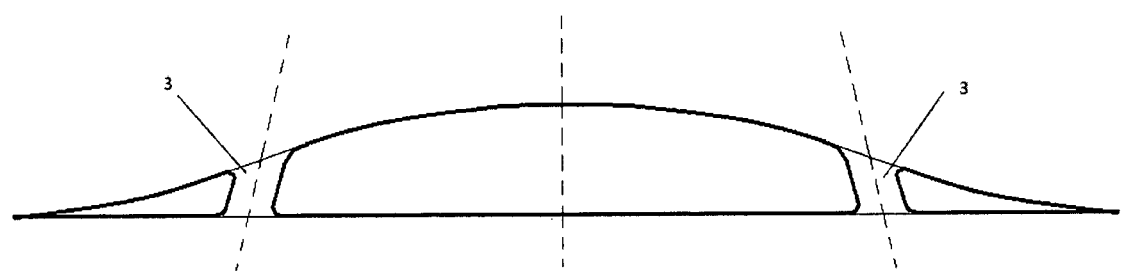
FIG. 6 is a view of the positioning of the axis of the vertical propellers to the central axis of symmetry of the device.

Vertical intubated propellers 3 are designed to ensure takeoff and vertical landing of the aircraft, to maintain its sustentation when the body of the aircraft does not generate enough load force displacement of ensuring the operation of the apparatus in this lifting mode, but also to provide certain maneuvers in the cruise mode of the aircraft. The electric motors of the intubated propellers motors are powered by the group of electric accumulators 6. The power of the engines of vertical intubated propellers 3 must provide a thrust I weight ration higher than one for the aircraft to be able to takeoff and land vertically. The command of the vertical intubated propellers 3 is made by the electronic control and flight management module 7 and by the speed governors 8. As these intubated propellers must provide a tensile force sufficient to takeoff, to increase their efficiency ("disk loading") lips of the inlets and outlets, m and n—FIG. 5—would be shaped such that through the Coanda effect to increase the air suction ability on the surface of the upper surface and at the same time the evacuated stream to have a higher dispersion area. Also, to increase stability of the apparatus, the axis of the vertical intubated propellers 3 can be inclined at an angle corresponding evenly to the vertical central axis of the carrying body 1—FIG. 6.

Figure 7:
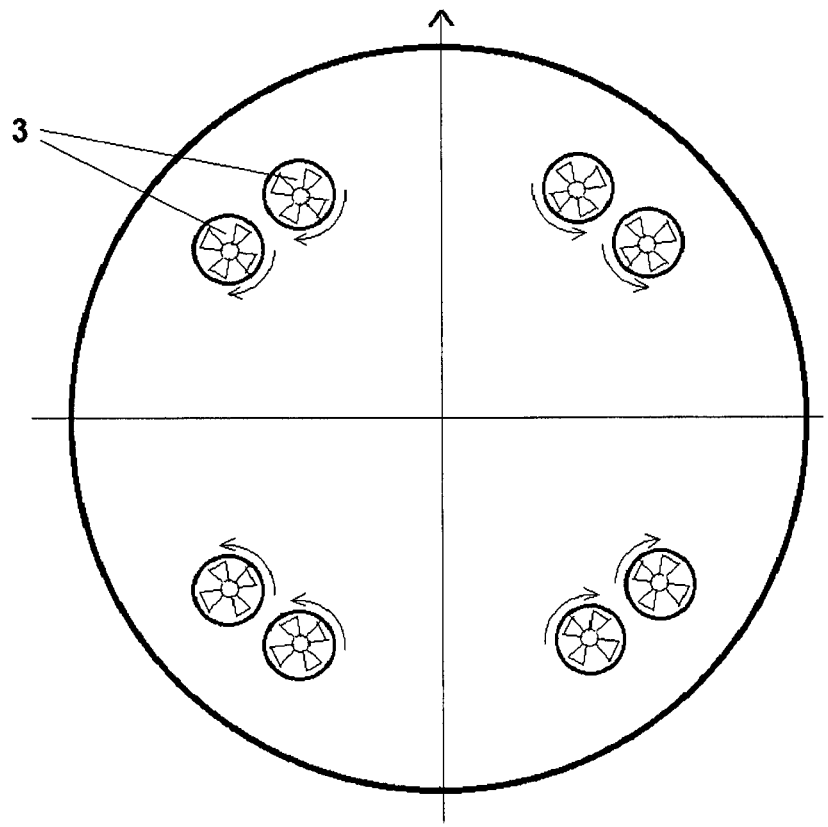
FIG. 7 is a version with eight vertical lifting propellers, divided into four pairs.

Also, in order to achieve more efficient large suction currents on the soffit of the flight body in order to generate a better distribution of the low pressure on its surface, eight vertical intubated propellers 3 can be used disposed in four pairs arranged symmetrically about the axes of the machine, the component propellers of a pair have identical rotation directions, opposite pairs having the same direction and those enclosed opposite directions—FIG. 7. They will achieve a more effective absorption of the air from the upper side of the aircraft and will noticeably increase the power of vertical traction of the machine, without adding too much extra weight. The component propellers of a pair have a common order they are operated at the same speed, and in this way the aircraft retains the same flight characteristics as the four propellers.

It should also be noted that the aircraft can also fly with a larger number of vertical intubated propellers which can operate in a grouped manner as described above. Using a larger number of vertical intubated propellers 3 there will be a static distributive lifting.

For some versions of the aircraft there can be used bidirectional propellers driven by electric reversible motors. Thus vertical intubated propellers 3 may direct the jet both down and up, increasing thus increasing the maneuvering capabilities of the aircraft. Thus, the machine can rotate around its flight axis and perform inverted flight using the vertical intubated bidirectional propellers 3, which reverse its direction of rotation while turning the aircraft around the flight axis, after its turning angle exceeded 90 degrees to the horizontal plane. Also, in the same way the aircraft can also rotate around the transverse axis. Such maneuvers are known in the art to be characteristic of a quadcopter equipped with reversible motors and bidirectional propellers.

Figure 8:
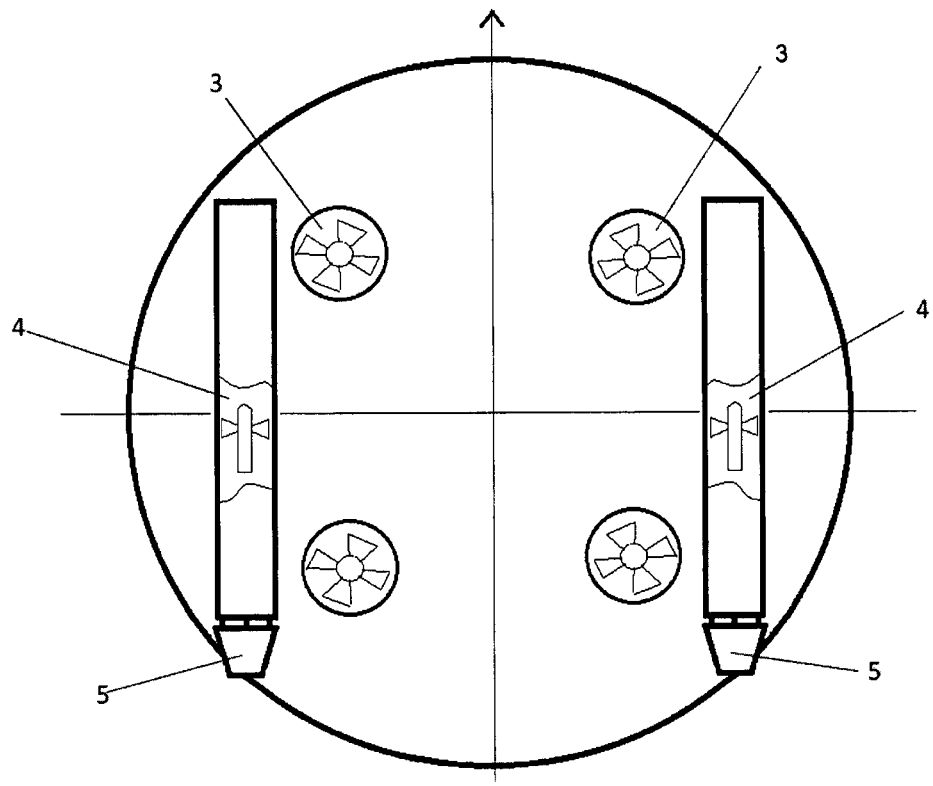
FIG. 8 is a view of the soffit of the aircraft with the arrangement of the horizontal intubated propellers in the version where these are placed outside the load•bearing body.
Figure 9:
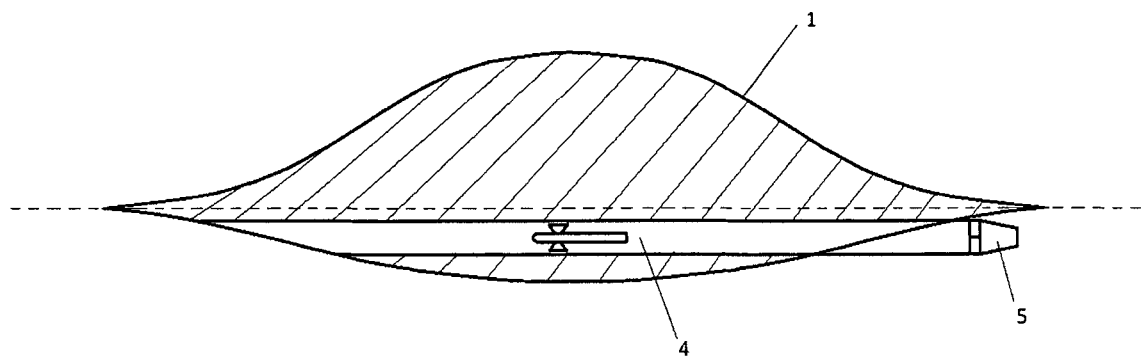
FIG. 9 is a section through the load-bearing body on the profiled soffit version of it, having the horizontal intubated propellers placed inside the body.

Horizontal intubated propellers 4 are arranged horizontally symmetrical on both sides of the predetermined flight axis and parallel with it—FIG. 8. The horizontal intubated propellers 4 serve to propel the aircraft horizontally. These intubated propellers provide horizontal traction of the aircraft in order to obtain a force of lift allowing dynamic sustentation set during its horizontal movement with a corresponding speed. The horizontal intubated propellers 4 may be located outside the bearing body mounted on the soffit of the aircraft when it is flat, may be-placed entirely within the carrying body, with the vector nozzle 5 outside thereof when the soffit is profiled as shown in FIG. 9, or they may be located partly within and partly outside the body supporting it. In the case where the horizontal intubated propellers 4 are placed outside the bearing body 1, they may be mounted parallel to the inner platform 2 the outer part of which constitutes the soffit of bearing body 1 or can be mounted inclined at an angle such that when flying in cruising mode the aircraft may have optimal angle of incidence and the orientation of the axis of the horizontal intubated propellers 4 to coincide with the flight direction of the aircraft.

The horizontal intubated propellers 4 have similar structure with the vertical ones, but with the following differences: the tubes are longer, the inlets are profiled air inlet at high speed and at the rear are provided with converged vector nozzles for ejection 5.

It is preferable that the rotation directions of the horizontal propellers 4 to be opposed to cancel any spurious points. Since the horizontal intubated propellers 4 are used in cruising flight, their thrust will be chosen depending on the desired performances. If the aircraft is small and is intended for short-haul flights, the horizontal intubated propellers 4 can be driven by electric motors, and for long distances the electric motors can be replaced with piston heat engines or Wankel type engines 11 or hybrid drive systems 12. For high speed, horizontal intubated propellers 4 can be replaced by turbojet engines 13 or even ramjet engines 35 or rocket engines. An alternative engine version for medium cruising speeds is the pulsejet reactor engine —14. These versions will be described separately.

Figure 10:
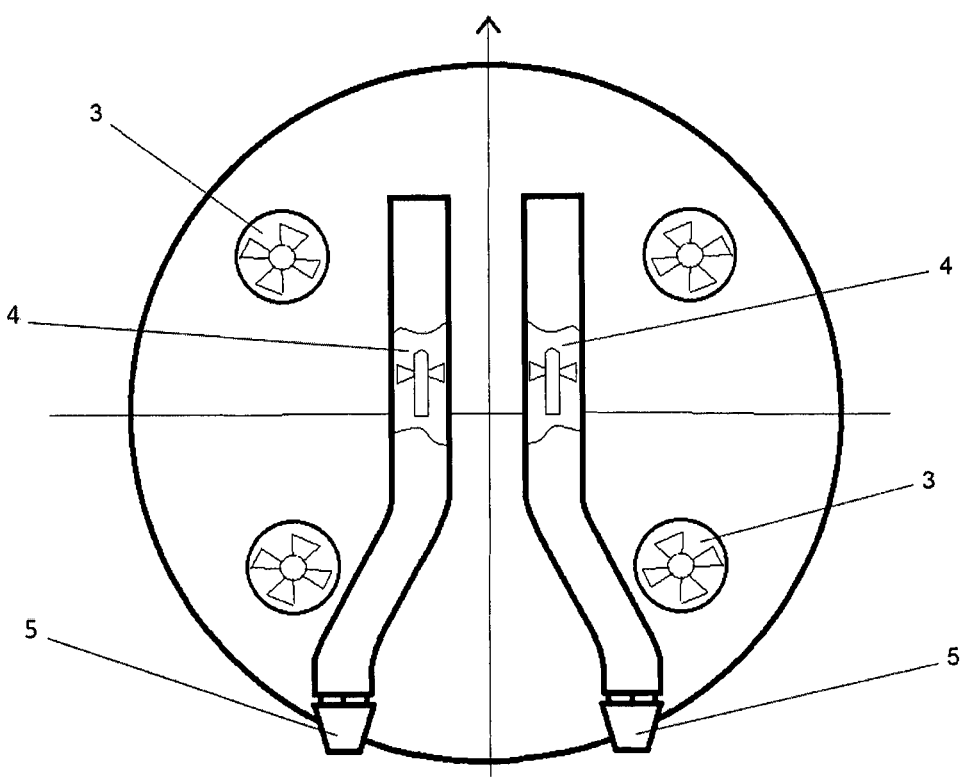
FIG. 10 is an embodiment with the engines of the horizontal intubated propellers located near the flight axis and the vectorial nozzles spaced.

For a better balance of the aircraft the motors of the horizontal intubated propellers can be arranged, as shown in FIG. 10, in the proximity of the central vertical axis of the aircraft, and the vector nozzles will be placed at a greater distance from each other, in order to more efficiently generate the moments required for the handling of the aircraft, and thus the tubes of the intubated propellers will have a curved shape. This embodiment is best suited for when the intubated propellers are located within the bearing body.

Figure 11:
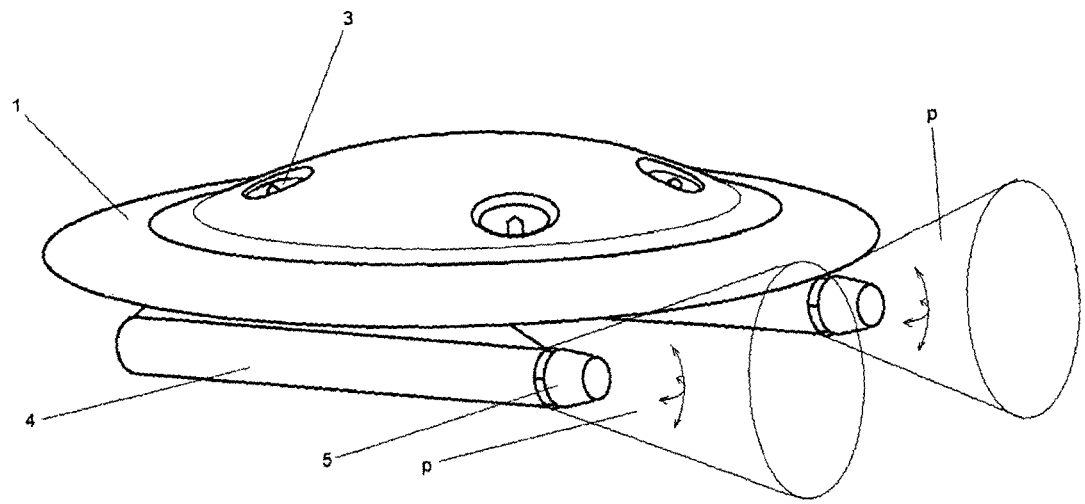
FIG. 11 is a view which shows the cones inside which the jet can be oriented through the vector nozzles.

FIG. 11 presents an embodiment of the aircraft in which the vector nozzles 5 show a convergent form and can move simultaneously both vertically and horizontally and can guide the jet in any direction contained within cones p whose generators meet on the axes of the horizontal intubated propellers 4. The angle of the generator of these cones is technological limited by the type and construction method of the respective vector nozzles. The length of the horizontal intubated propellers 4 will be large enough so that the stream that runs through the vector nozzles 5 does not interact with the edge of the bearing body 1. The nozzles move horizontally and vertically using two actuators y and z that move the nozzle in vertical and horizontal planes with levers. This embodiment of achieving vector nozzles is known in the current art, but more complex vector nozzles can also be used such as those used by jet aircrafts with this kind of traction.

Vector nozzles 5 are designed to ensure the aircraft's main maneuvers in flight mode in dynamic lifting produced by horizontal intubated propellers 4.

The group of electric accumulators 6 has the role of ensuring the electricity necessary to operate all engines and electrical and electronic devices on board. The group of electric accumulators 6 can operate as a single source for all engines unit, or each motor as a power source may have one distinct accumulator or a distinct group of accumulators. The total power of the electric accumulators must be sufficient to provide power to run electrical and electronic devices on board to provide the power required for takeoff to the engines of the vertical propellers simultaneously with the power necessary to the engines of the horizontal propellers for propulsion until reaching cruising speed following that after this, the electricity to be consumed only for maintaining cruising speed, for maneuvering flight and operation of electrical and electronic devices, marked preservation of stored electrical energy sufficient for moving back to the lifting mode and carrying out landing maneuvers. Since the aircraft requires a higher power for takeoff phase, this implies a rapid discharge rate of the accumulators and to fill this need, concomitantly with electric accumulators and it can also be used supercapacitors. They are lightweight and have a high density power and provide in the short-term the electric power required during takeoff and up to reaching cruising speed. Electric accumulators can be replaced by any source that can provide electricity and are suitable for such use. An example is the lightweight fuel cells.

The role of the electronic control and flight management module 7 is to take the orders of the either on board or on the ground via a receiver I transmitter interface, interpret them and then to electronically order the aggregates and the devices of the aircraft so that they faithfully carry out commands from the pilot. The electronic control and flight management module 7 can be built for such a purpose or may consist of pilot units with open source platforms that already are on the market such as Arduino I Ardupilot, OpenPilot, Paparazzi, Pixhawk, Aeroquad, Mikrokopter, KKMulticopter etc. Basically the electronic control and flight management module 7 consists of an electronic platform containing an electronic microprocessor, electronic memory and interfaces for input I output data which together form a programmable complex, i.e. a so-called on board computer. In addition to this onboard computer, the electronic control and flight management module 7 also contains the following basic electronic devices: gyroscope, accelerometer, magnetometer, barometer. Through other interfaces and input I output ports the electronic control and flight management module 7 can also be connected to other additional devices such as ultrasonic devices for measuring the distance from the ground, GPS devices, Bluetooth, WiFi, video cameras etc. and can also receive monitoring data on engine speed, the temperature sensors, battery charge sensors etc. Through the output interfaces the electronic flight module 7 transmits commands to the speed governors 8 and by default to the engine of the intubated propellers 3 and 4 and the nozzles 5 according to orders received from the pilot and can also receive feedback information from them through the input I output ports.

Generally pilot units on the market are already equipped with various functions of the device and automatically maintaining certain flight characteristics such as for example gyroscopic stabilizing or the automated maintaining the travel altitude or the distance from the ground, travel speed etc.

For ease of operation unit and its construction and to use pilot units already on the market, electronic control and flight management module 7 can be made up mainly of two pilot-units as described above, the first of them 15 will manage the sustentation of the aircraft in quadcopter mode ordering the vertical intubated propellers 3, and the second pilot unit 16 will be used to control the horizontal propulsion, i.e. horizontal intubated propellers 4 and nozzles 5. The two pilot-units can be ordered independently by the pilot or operate unitary via an interface that transmits data between the two units that integrates and coordinates the premises.

Figure 12:
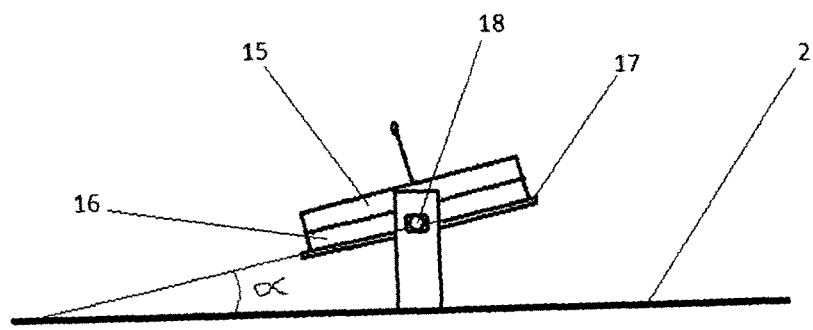
FIG. 12 is an illustration of an embodiment of the electronic control module and flight management with both pilot unit components located on the same mobile support that can tilt along the flight axis.

Both pilot units will be located in the symmetry center of the aircraft, oriented along the flight axis of the aircraft according to the manufacturer's indications, and jointly arranged one above the other. Said pilot units will be mounted on a mobile support 17 which can tilt to the horizontal axis of the aircraft in the direction of the flight axis with a modifiable angle via a servomotor 18—FIG. 12. An embodiment can be done through which mobile holder 17 can be inclined in any direction, the support being located on a pivoting gimbals system in three axes.

Given that the two units are arranged in parallel planes and are jointly mounted, the sensors of the respective units have the same values and thus the aircraft will maintain its trajectory and position when the flight management exchange between the two units takes place.

The electronic control and flight management module 7 communicates with the pilot either through direct means, if the pilot is on board, either via a receiver I transmitter (radio I GSM I etc.) interface which communicates with the control station located on the ground.

The aircraft can perform autonomous pre-programmed flights without requiring human intervention during flight.

The electronic control and flight management module 7 will be scheduled so as at the decrease of the horizontal speed at which electromagnetic force becomes lower than the weight, said module automatically orders the entry into operation of vertical intubated propellers 3 for supplementing the lifting force or for total transition to the lifting flight regime produced by the propellers intubated vertical 3. This order will be triggered when the sensors of the module will notice a drop in altitude that is not due to pilot commands. Also, the electronic flight module will be programmed so that during the cruising flight to warn the pilot (either on the ground or on board) if accidentally the amount of electricity on board becomes insufficient to fulfill flight and if the pilot ignores these warnings, the flight module will automatically initiate landing procedure regardless of pilot orders.

As an additional safety measure of the aircraft it can be provided also with a landing parachute triggered automatically in the event of problems because of which landing can no longer be performed safely with the means on board.

Speed governors 8 are designed to ensure the operation of electric motors of the intubated propellers according to orders transmitted by the pilot via electronic control and flight management module 7. Given that we refer to an aircraft, these speed governors will be selected or constructed taking into account the safety coefficients required for safely operating the engines.

The landing gear 9 is to promote contact between aircraft and ground. It will be high enough to prevent the unwanted turbulence formation on the soffit of the aircraft during the takeoff phase. Preferably, it will be retractable in its entirety. Also, it may be provided with wheels.

Radio remote control 10 is designed to transmit via radio waves the commands of the ground-based pilot (in the embodiment where the aircraft is operated from the ground).

Flight procedure is as follows:

The first phase of flight is the vertical takeoff of the aircraft. By ordering the pilot on the ground or on board the takeoff phase is initiated by turning off vertical intubated propellers 3, without turning on the horizontal ones 4. In this phase of the flight, the aircraft takes off and is handled basically as a classical quadcopter I multicopter this flying in lifting regimen using the vertical propellers. The way of obtaining the maneuvers in this flight regime is known in the current art and thus pitch, roll, yaw movements and the horizontal translations can be obtained as in any quadcopter by asymmetric changing of the speeds of vertical intubated propellers 3 and for obtaining vertical translation through the simultaneous increase or decrease of the speeds of the vertical intubated propellers 3. This flight phase is managed through pilot unit 15 of module 7.

Figure 13:
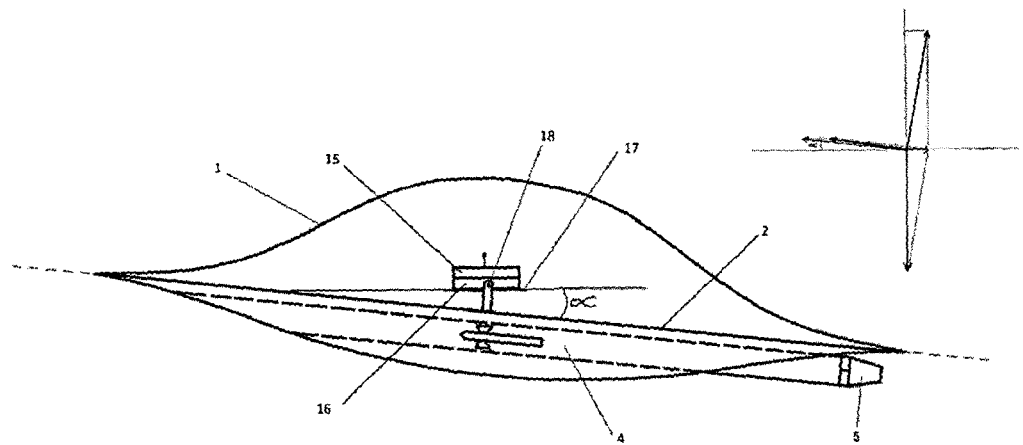
FIG. 13 is an illustration of the derivation of the angle of incidence of the apparatus.
Figure 14:
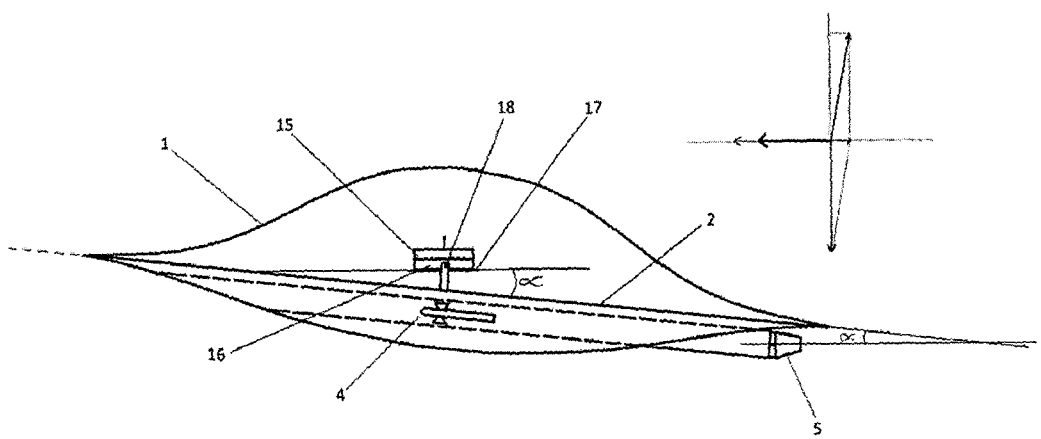
FIG. 14 is another illustration of the derivation of the angle of incidence.

Second phase of flight is the transition from the lifting mode obtained using vertical intubated propellers, to the dynamic lifting mode obtained by achieving a bearing strength resulting from moving the aircraft through the air using the horizontal intubated propellers. For a swift entry into the dynamic lifting mode it is necessary to obtain the appropriate angle of incidence. This change of the angle of incidence can be achieved in three ways:

the first way to change the angle of incidence is obtained by tilting the control module and flight management module 7, which comprises two pilot units 15 and 16, with a desired angle a to the inner platform 2 to the predetermined flight direction, thus changing the horizontality landmark of pilot units. Since the pilot units on the market are programmed at the factory to keep the horizontality of the ground consequently pilot-unit 15 will command the increasing of the speed of propellers 3a and 3b, simultaneously with decreasing speed to propellers 3c and 3d which will lead to the tilting of the aircraft with the same angle $\alpha$ and a backwards movement of the aircraft. To compensate for this backwards movement of the machine, while tilting the pilot unit 15, the horizontal intubated propellers 4—which vector nozzles remain in a neutral position, increase their speed at a value at which the horizontal component of the tactile force exceeds the horizontal component of the traction force resulting from the asymmetric speed of the vertical propellers which move the aircraft backwards, thus resulting a forward movement of the aircraft with the desired angle $\alpha$ of incidence as shown in FIG. 13. If the pilot unit 15 has the altitude hold function active it can be achieved a compensation of all traction forces developed by the propellers of the aircraft and its weight thereby achieving an ordered hover with a tilted angle a (alpha).

the second way of obtaining the angle of incidence is similar to the first, only that, simultaneously with the tilt of the control and flight management module 7 it is oriented upwards with the same angle and the two vector nozzles 5—FIG. 14.

In this flight phase the flight management is transferred from pilot unit 15 to pilot unit 16. Since the pilot unit 15 and pilot unit 16 have the same angle of inclination, at the transfer of flight management between the two pilot-units he trajectory and the position of the aircraft will be maintained.

The third phase of flight is that of dynamic lifting mode flight. In this phase the horizontal intubated propellers 4 will power the aircraft with a speed greater than or equal to the rate at which the dynamic sustentation is obtained, and with getting this speed the speed of the vertical intubated propellers 4 will drop to zero, they no longer be needed to achieve sustentation.

The main maneuvers of the aircraft will be made using vector nozzles 5 and only for some additional maneuvers the vertical intubated propellers 3 can also be used. At this stage of flight the flight management will be done through pilot unit 16.

Fourth flight phase is the transition from the dynamic lifting mode flight to that of lifting flight mode produced by the vertical propellers. After decreasing of the speed of the aircraft to the value at which dynamic sustentation decreases, the aircraft automatically switches using control and flight management module 7 to the other lifting mode that is the one obtained by turning on the vertical intubated propellers 3. The vertical intubated propellers 3 will run concurrently with the horizontal intubated propellers, a period of time until they eventually reduce its thrust to zero. During this time the module 7 lies in a plane parallel to the inner platform 2 in order to obtain a zero angle of incidence of the aircraft, the aircraft orienting itself parallel to the ground. In this flight phase the flight management is transferred from unit to pilot-unit 16 to pilot unit 15.

Figure 15:
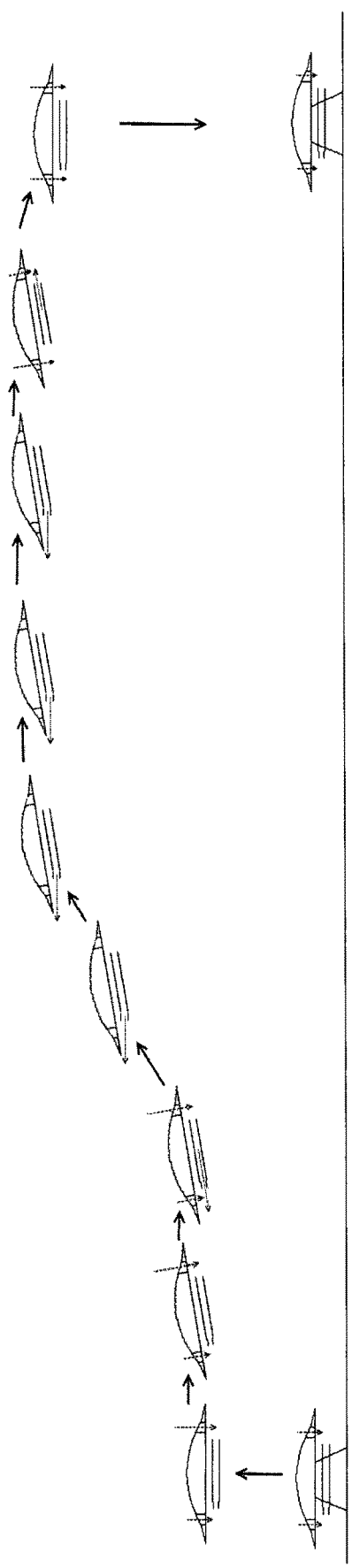
FIG. 15 is a schematic presentation of the main phases of the flight process.

Fifth phase of flight is that of vertical landing, the device will land in the already known manner of any quadcopter I multicopter only using the vertical intubated propellers 3. This flight phase is managed through pilot unit 15. The five main phases of the flight procedure are illustrated in FIG. 15.

It is additionally noted that if the aircraft is equipped with landing gear equipped with wheels, it can take off and land like a classic airplane.

Figure 16:
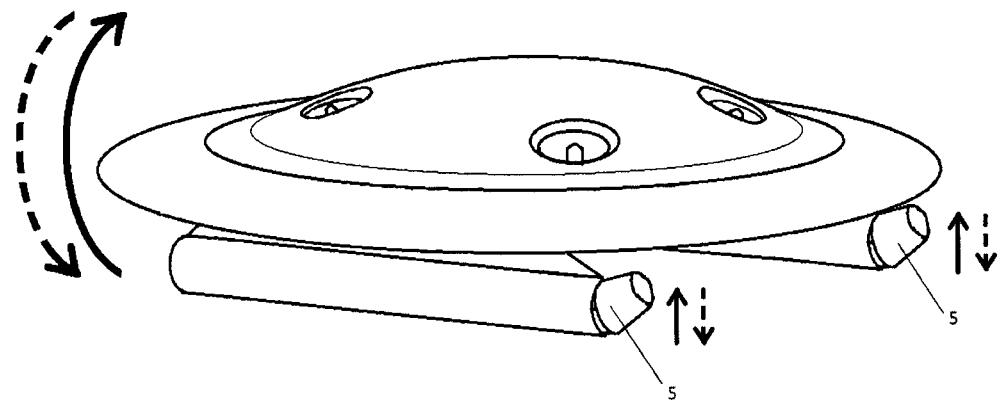
FIG. 16 is an overview of how to obtain pitching motion using the vector nozzles.
Figure 17:
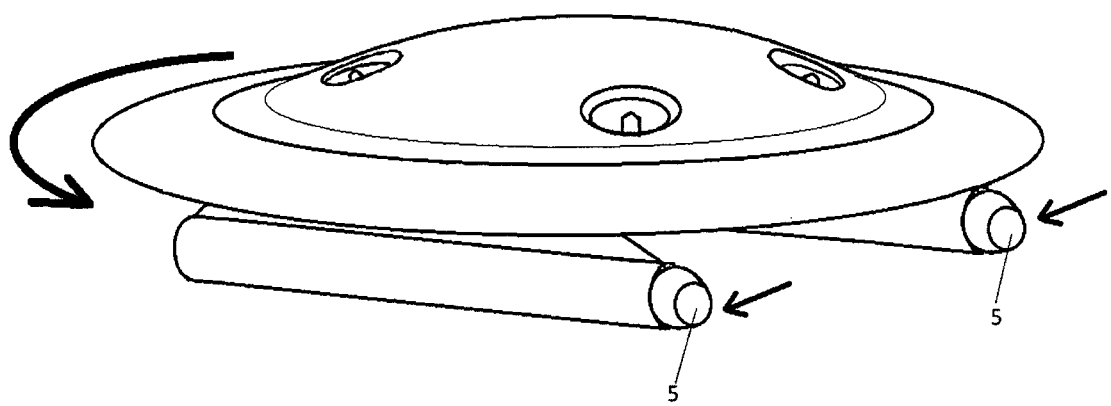
FIG. 17 is getting left yaw movement using vector nozzles.
Figure 18:
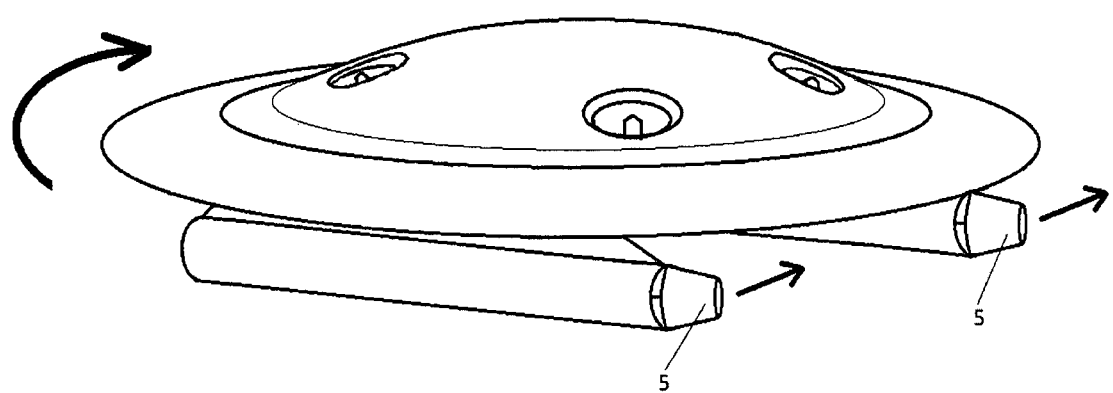
FIG. 18 is getting to the right yaw movement using vector nozzles.
Figure 19:
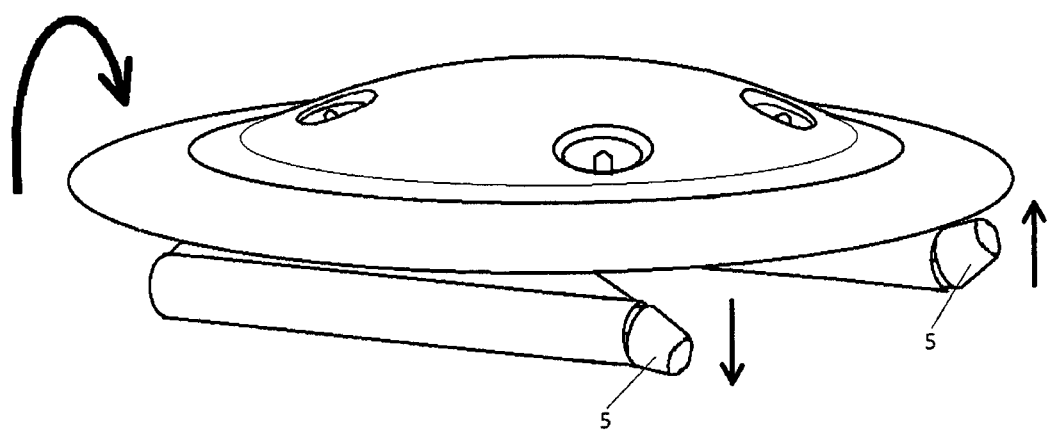
FIG. 19 is getting to the right rolling motion using vector nozzles.
Figure 20:
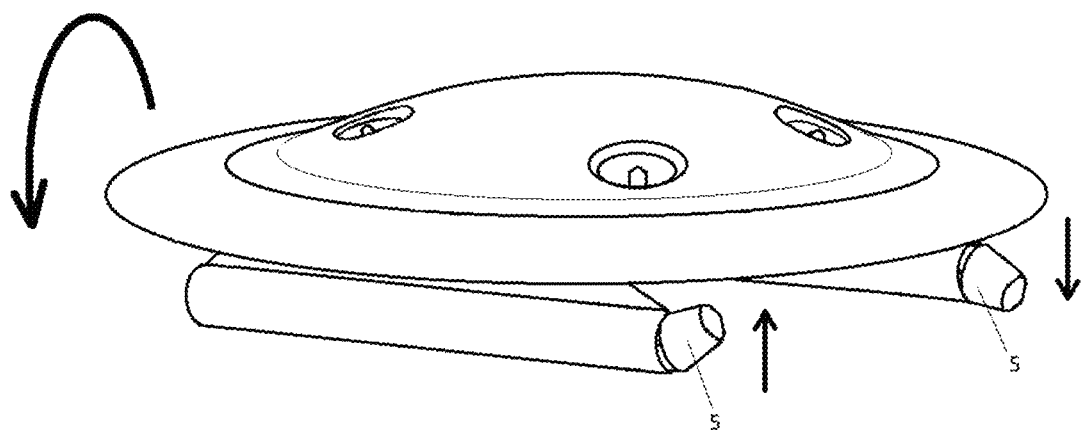
FIG. 20 is getting rolling movement to the left with the vector nozzles.

During the dynamic lifting mode flight the main maneuvers of the aircraft will be made using vector nozzles 5. Thus, by their simultaneous orientation in the same direction vertically up or down, the pitching motion is obtained—FIG. 16. By targeting vector nozzles horizontally to the left the turning movement to the left of the aircraft is obtained—FIG. 17 and by orienting the nozzles horizontally to the right the turning movement to the right of the of the aircraft is obtained—FIG. 18. By simultaneously orienting vector nozzles simultaneously in opposite directions vertically the roll movement of the aircraft is achieved. Thus, by orienting upwards the right vector nozzle, while downwardly orienting the left one the roll movement to the right is obtained, as shown in FIG. 19, and through orienting the right nozzle down while targeting the left one up the roll movement of the aircraft to the left is obtained, as shown in FIG. 20. Through the simultaneous orientation of the vector nozzles in any direction within the cone p combined motions are obtained as described above.

The gyration of the aircraft can also be achieved by asymmetric traction of the horizontal intubated propellers, but this maneuver will be used in cases of emergency only, when the turn cannot be achieved by the means described above. In case of horizontal propeller engine failure the asymmetric traction resulting from this can be compensated by vector nozzles by targeting the opposite of the part on which the specific engine damaged in a similar way can be found, maneuver similar to the compensation maneuver of classic airplanes using drift direction.

During the dynamic lifting flight regime the maneuverability of the aircraft can be supplemented by the vertical intubated propellers 3, which can perform vertical or oblique translation maneuvers relative to the direction of flight, without the modification of the angle of incidence of the aircraft. Also, three vertical intubated propellers can run other commands during cruising flight, which combined with maneuvers generated by the nozzles 5 can provide an aircraft maneuverability superior to that of existing aircrafts. Thus, the use of bidirectional vertical intubated propellers 3 can enhance the maneuverability of the aircraft it can more quickly execute maneuvers such as to no, looping, and inverted flight and quickly translate to lower altitudes without changing the angle of incidence.

Simultaneously with superior maneuvering capabilities, it can still generate additional air maneuver capacity, non-existent in current aircrafts namely horizontal translation during cruising flight without changing the angle of incidence.

Figure 21:
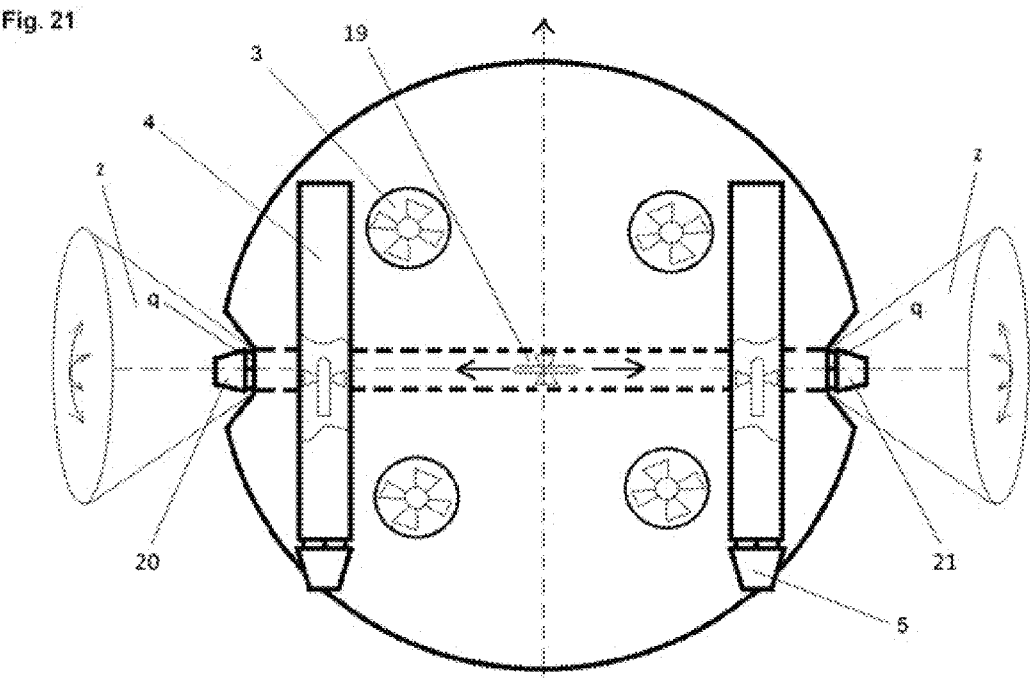
FIG. 21 is an embodiment of the aircraft in which it is provided with transverse two-way intubated propeller positioned within the bearing body perpendicular to the flight axis.

By placing a transverse bidirectional intubated propeller 19 in the horizontal plane perpendicular to the flight axis and passing through the vertical symmetry axis of the aircraft, positioned inside the bearing body 1—FIG. 21, the aircraft may be capable of horizontal translation which combined with maneuver capabilities described above obtained using vertical intubated propellers 3 and the pitching, roll and yaw movements that can be generated by horizontal intubated propellers 4 by means of vector nozzles 5 may ensure the aircraft maneuvering capabilities superior to all known aircrafts. And, to be able to further increase the capability of side maneuver of the aircraft, the tube ends of the transverse bidirectional intubated propeller 19 will be provided with three-dimensional vector nozzles 20 and 21 which can guide inside a cone z, and this whole side maneuver will be controlled either independently of other maneuver devices of the aircraft, either linked to them. In order to assure the inlet of a sufficient amount of necessary air, the tube of the transverse intubated propeller 19 is provided at each end in the proximity of the vector nozzles with valves or hatches q and r which are operated by depression towards the interior of the tube in order to ensure the intake of a sufficient quantity of air which will be ejected at the other end of the tube.

The tube of the transverse intubated propeller 19 which is placed perpendicular to the flight axis on the inside of the housing 1 will have a curved shape towards the outer back and soffit as to avoid the center of the housing, but in order to preserve symmetry to the flight axis.

Figure 22:
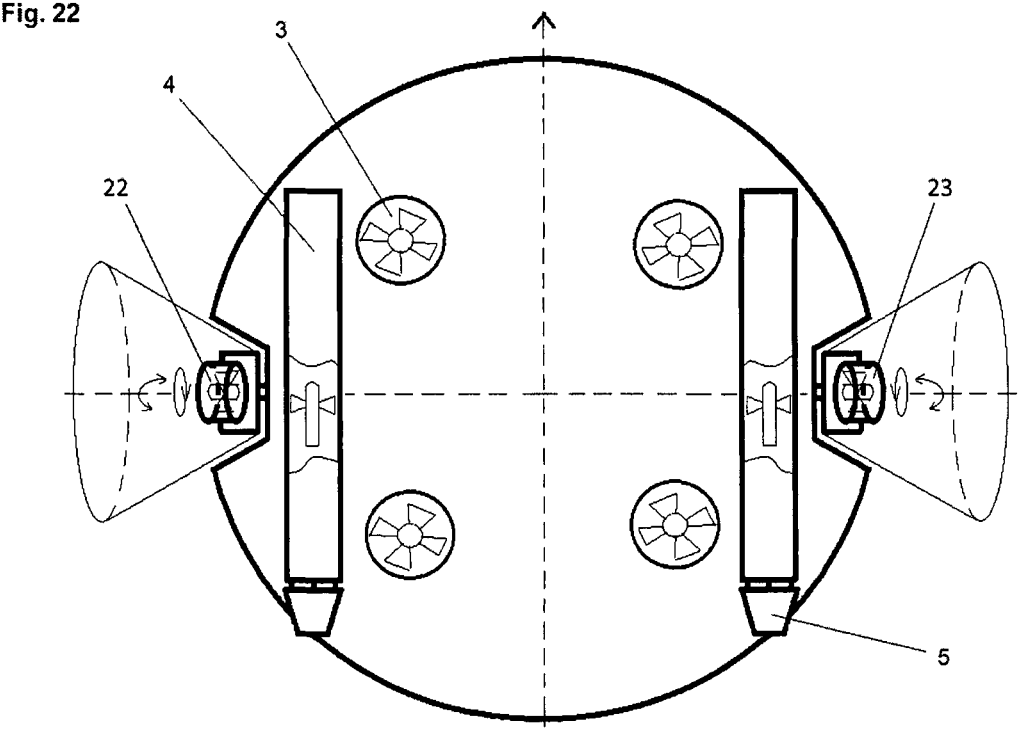
FIG. 22 shows an embodiment of the aircraft in which it is provided with one-way transverse-intubated propellers situated outside the bearing body in its sides.

The bidirectional intubated propeller 19 may be replaced by two individual unidirectional intubated side propellers 22 and 23 located outside the bearing body 1 in both sides of it, possibly in some streamlined recesses—FIG. 22, which are three•dimensionally steerable by mounting them in gimbal type devices. They can be operated individually or in combination with one another or in combination individually or simultaneously with other maneuvering devices of the aircraft. Besides the lateral translation movements, these intubated individual propellers can contribute to other complex maneuvers of the aircraft: vertical translations or translations with vertical components, movements with the yaw component, roll motions or roll components and also can help supplement traction or braking aircraft, etc.

For the device to perform sudden maneuvers or even to accelerate or brake suddenly, the two transverse unidirectional intubated individual propellers 22 and 23 located outside the bearing body 1 can be replaced with two restartable rocket engines 36c, one for each side board fitted with vector nozzles or with rocket engines fully mounted on a gimbal-type mechanism.

Figure 23:
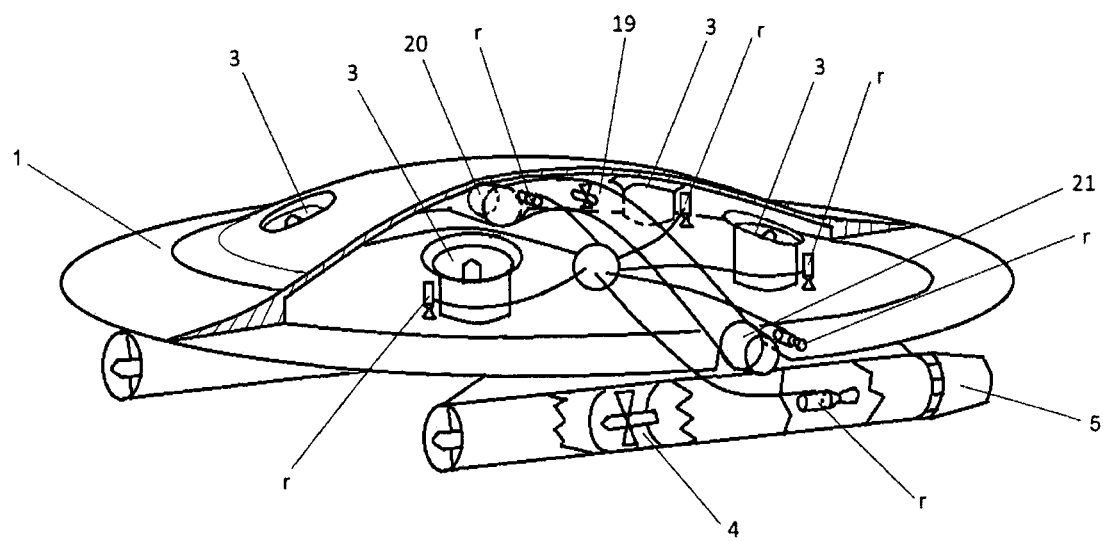
FIG. 23 shows an embodiment of the aircraft in which it is provided with restartable rocket engines fitted twinned each with an intubated propeller together forming mixed pairs of thrusters.

If the desired aircraft has to have fast takeoff capabilities and an ability to suddenly perform maneuvers, rocket engines can be added. Because rocket engines have a short period of service, while they can develop a very high traction, they will be twin mounted with one propeller forming practically a mixed pair of propellants, following that in normal flight maneuvers intubated propellers to be used, and if the need for very rapid takeoff and I or execution of sudden maneuvers, rocket engines r are used either separately or in conjunction with twin intubated propellers. Such rocket engines r can provide a parallel reaction and control system similar to that of the spacecrafts (reaction control system—RCS) that can operate independently or in conjunction with the other maneuver devices of the aircraft—FIG. 23.

Various type of engines can be used, such as monopropellant rocket engines r (e.g., with hydrazine or hydrogen peroxide), bipropellant, or cold-gas type.

Braking the aircraft can be done in three ways:
- by decreasing the traction of the horizontal intubated propellers 4 or even by reversing their rotation for the bidirectional propellers versions; of the aircraft using vector nozzles 5;
- by targeting forward the vector nozzles 20 and 21 the transverse bidirectional intubated propeller 19 or the side individual unidirectional intubated propellers 22 and 23 depending on the design of the aircraft.

If the four horizontal intubated propellers are triggered by reversible electric motors, they can be fitted with speed governors 8 that can operate engines in reverse, generating reverse thrust that decelerates the aircraft rapidly. Also, the braking capacity of the aircraft can be supplemented by the classical aerodynamic brake surfaces operated by screws.

Figure 24:
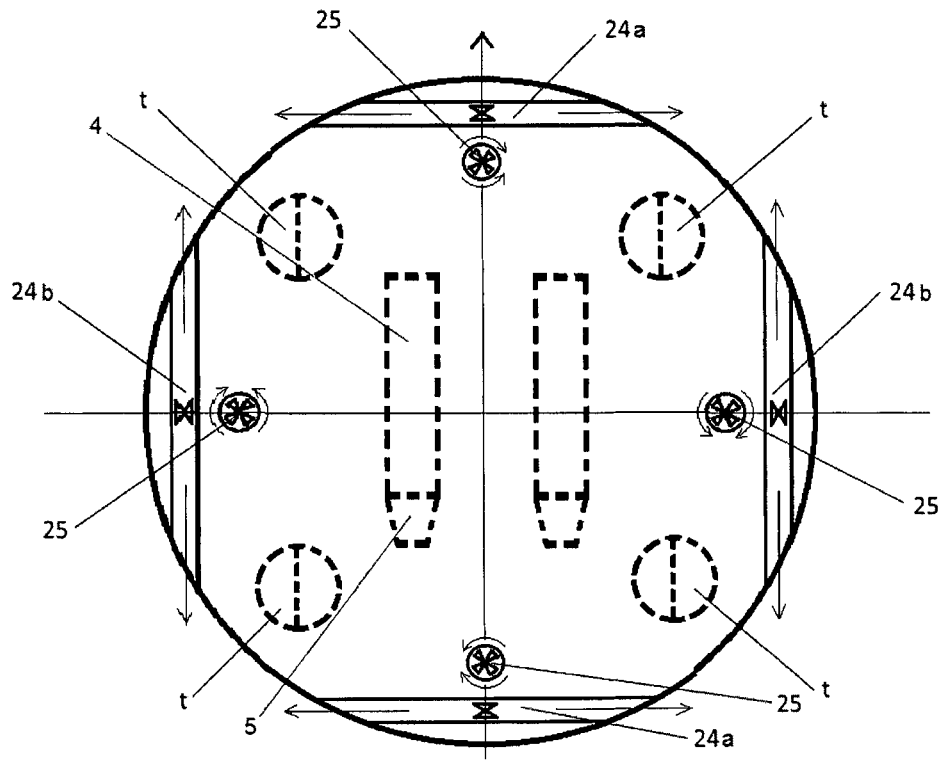
FIG. 24 shows an embodiment of the aircraft in which it is provided with the horizontal and vertical bidirectional propellers for maneuver disposed within the bearing body and the vertical intubated propellers are closed with hatches.
Figure 25:
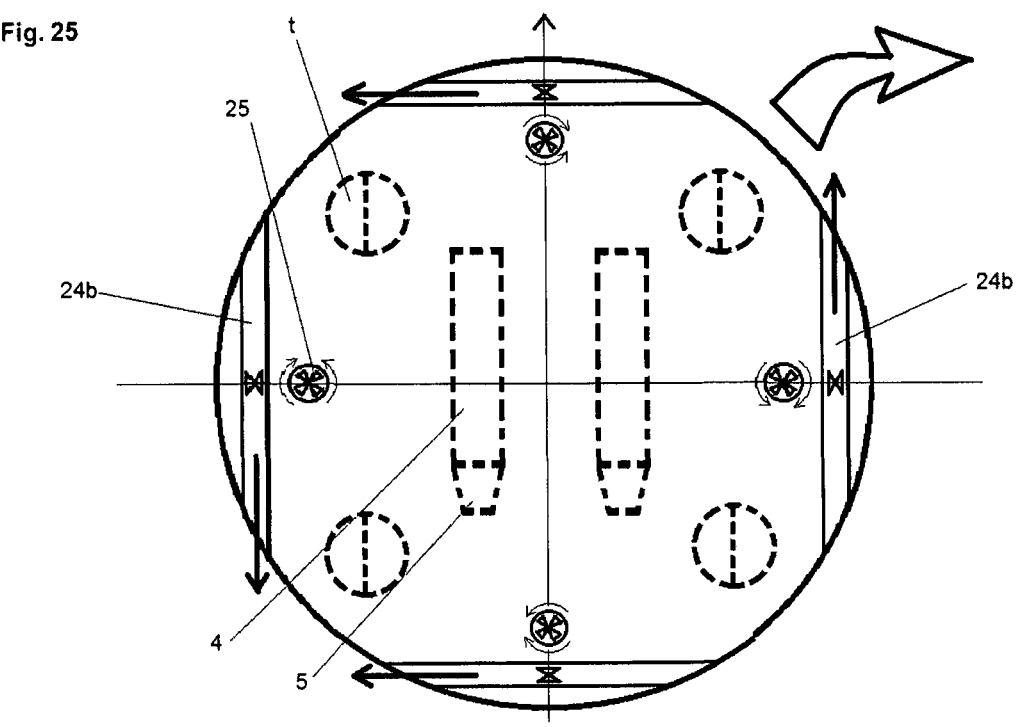
FIG. 25 shows the combined yawing maneuver with horizontal translation performed using horizontal maneuver propellers.

An embodiment of the aircraft which allows greater maneuverability also allows the closing of the vertical intubated propellers 3 with hatches t during cruising flight I shown in FIG. 24. This version has some horizontal bidirectional intubated propellers called horizontal maneuver propellers 24 which are arranged horizontally perpendicular and symmetrical on the axis of the aircraft to its ends, propellers 24a are perpendicular to the axis of flight and propellers 24b are parallel to the axis of flight, and each of these horizontal maneuver propellers are matched with a vertical bidirectional intubated propeller called vertical maneuvering propellers 25 and which are arranged vertically in the proximity of the horizontal maneuver propellers and being also perpendicular to the axes of the aircraft. All these propellers are inside the housing of the aircraft 1. Vertical maneuver propellers are smaller in diameter and have a lower power than the vertical intubated propellers 3, since their primary purpose is to provide vertical translation maneuvers, pitching or roll of the apparatus during the dynamic lifting flight mode. Vertical maneuver propellers 25 are arranged in the so-called cross system that is located on the axis of perpendicular flight to it and located on the transverse axis and perpendicular to it, as opposed to vertical intubated propellers 3 which are arranged in the X system. Vertical maneuver propellers can provide extra power during takeoff operating with the vertical propellers 3, the latter will be closed with hatches when reaching cruising speed to ensure better aerodynamics of the of the aircraft. Given that this embodiment allows the closure with hatches of the vertical propellers 3, they can be designed with a larger diameter in order to have greater efficiency in this case they can be also be trained by heat engines or replaced with turbojets, but the maneuver propellers will be driven by electric motors. The horizontal maneuver propellers 24 will provide the horizontal translations of the aircraft and as well as its yaw maneuvers. It is worth noting that the horizontal maneuver propellers 24 can change the direction of the flight of the aircraft very quickly by means of a maneuvering combination of them, following that the a pair of opposite propellers to execute a translation maneuver, with the same direction of ejection, and the other pair to execute a yaw movement, having opposite directions of ejection—FIG. 25. However the horizontal maneuver propellers 24b parallel to the flight axis of the aircraft can provide extra traction when needed for horizontal movement.

Figure 26:
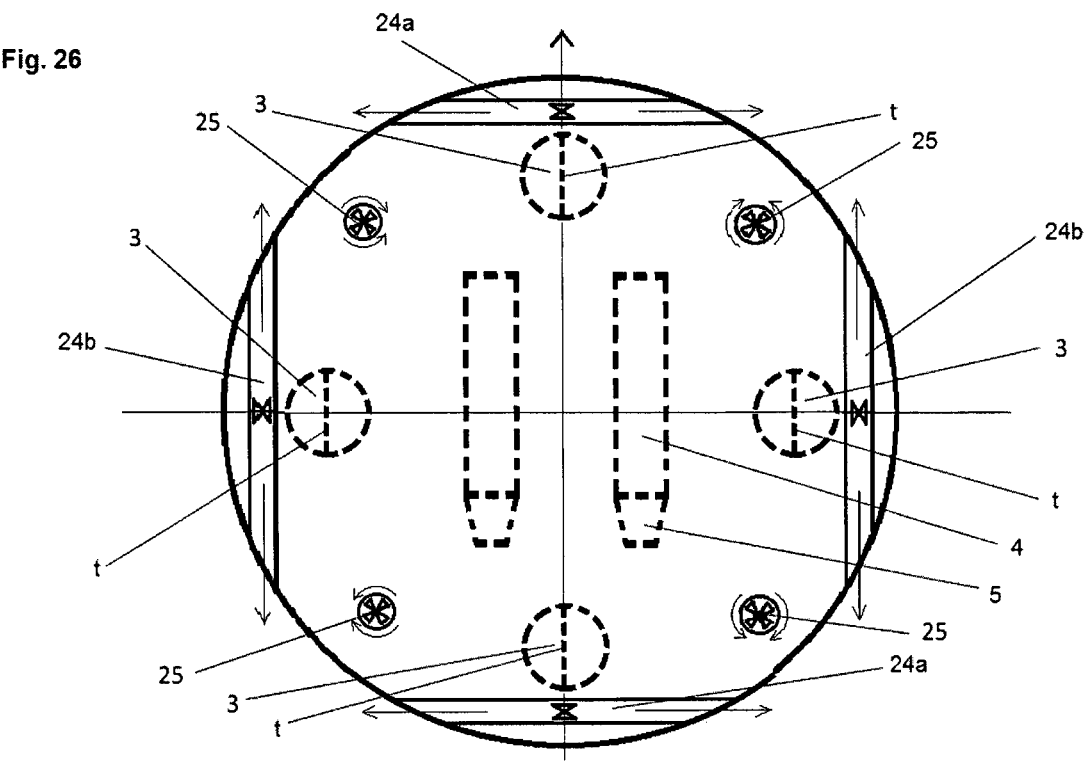
FIG. 26 shows an embodiment of the aircraft wherein it is provided with horizontal and vertical bidirectional maneuver propellers, where the vertical maneuver propellers are placed forming letter X, and the vertical takeoff and landing ones system is placed in cross.

In another embodiment the aircraft can also have a similar to the pattern having the horizontal and vertical maneuvering propellers, form of the aircraft which can be achieved either by the permutation of the position of the vertical intubated propellers 3 with the vertical maneuver propeller 25 and the horizontal bidirectional maneuver propellers 24 retain their position as in the version described above. Thus the vertical intubated propellers 3 will be arranged in a cross system, that is located on the flight axis perpendicular to it and located on the transverse axis and perpendicular to it, and the vertical maneuver propellers 25 will be arranged in the X system—FIG. 26. Considering that the vertical propellers 3 will close, during the cruising flight, with the hatches t, thereby obtaining a lower aerodynamic disturbance along the axis of flight.

Figure 27:
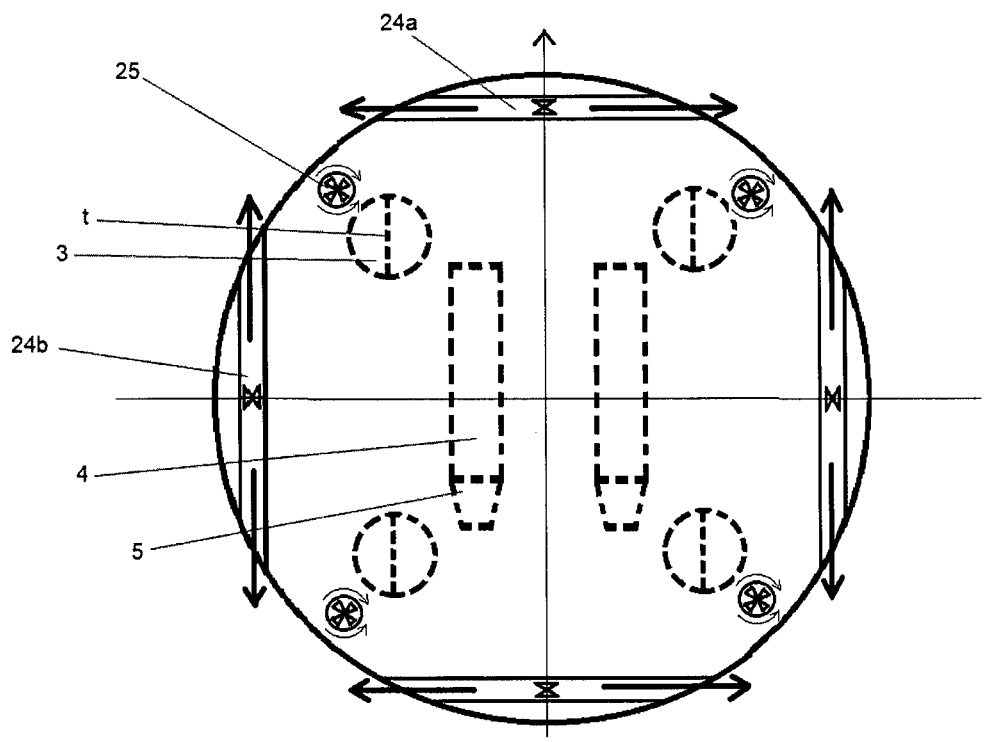
FIG. 27 shows an embodiment of the aircraft in which it is provided with the horizontal and vertical bidirectional maneuver propellers, the vertical maneuver propellers and the vertical takeoff and landing ones being both placed in X.

Another embodiment is the arrangement both of the vertical intubated propellers 3 and the maneuvering ones 25 in the same X system with placing the vertical bidirectional shunting propellers 25 to the edges of the bearing body. Thus, a greater bearing surface and lower turbulence can be achieved during cruising flight—FIG. 27.

Figure 28:
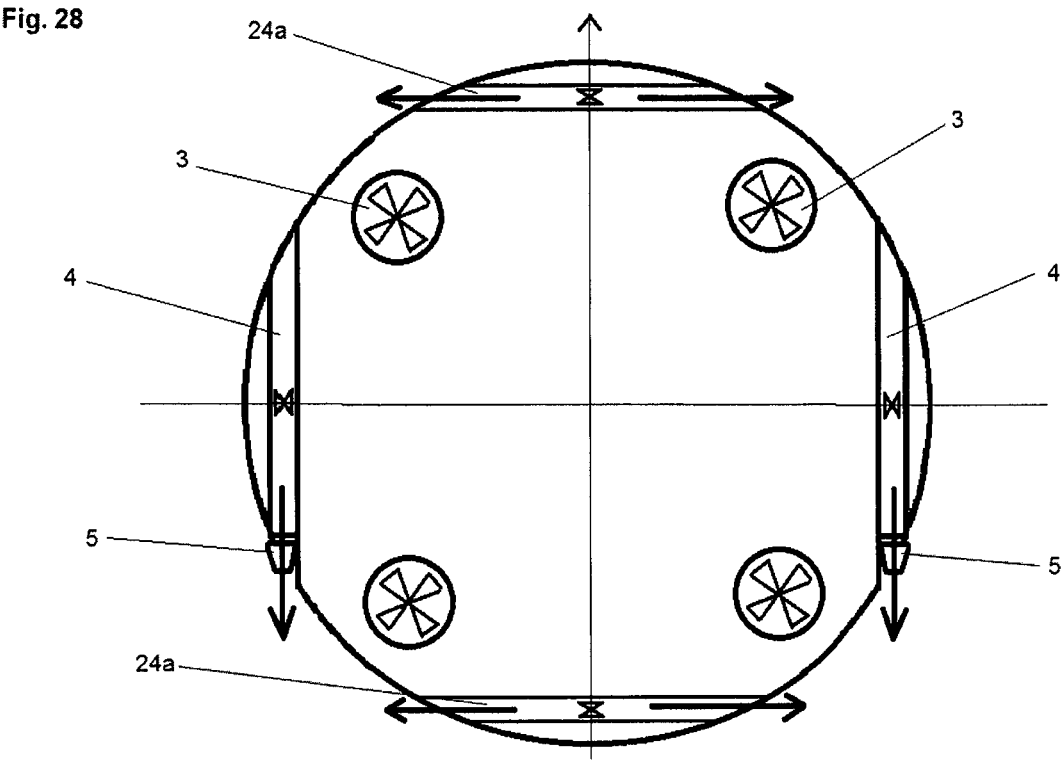
FIG. 28 shows an embodiment of the aircraft in which it is provided with two maneuver horizontal bidirectional propellers perpendicular to the flight axis.

A relatively simple embodiment, which gives the aircraft increased maneuverability is one in which we have the vertical intubated propellers 3 and the horizontal propellers 4 provided with vector nozzles 5, with the addition of only a couple of horizontal bidirectional transverse maneuver propellers, namely the ones placed perpendicular on the flight axis 24a-FIG. 28.

Figure 29:
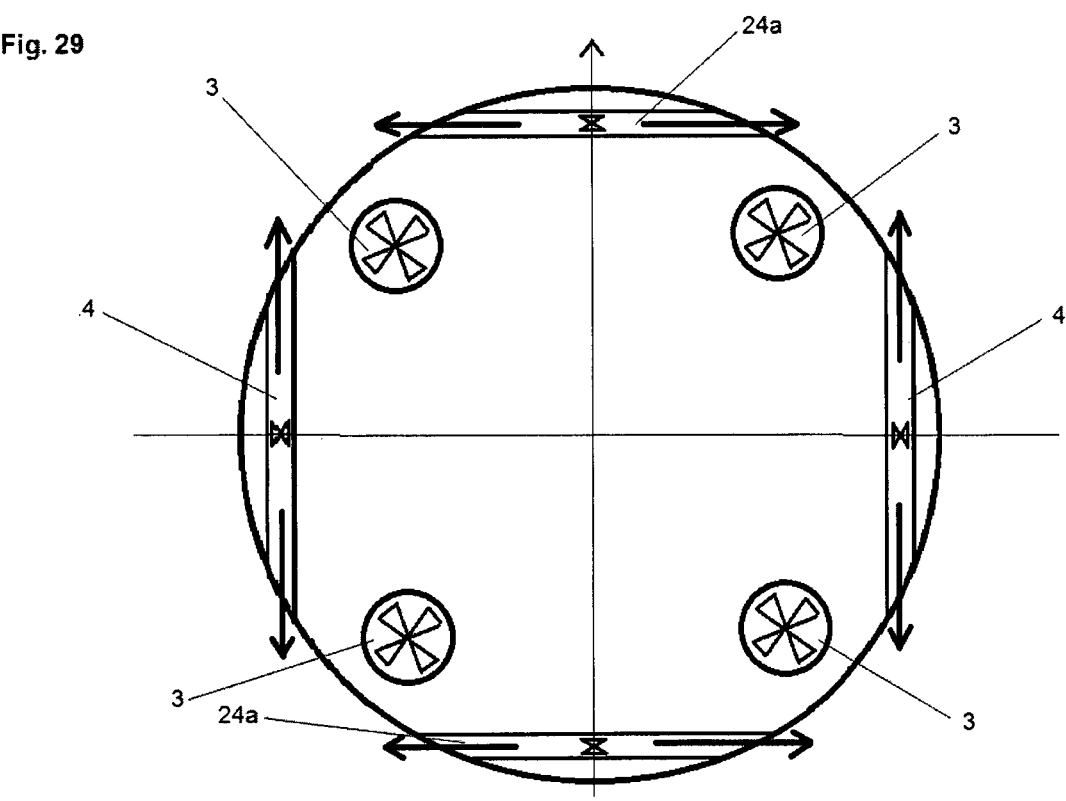
FIG. 29 shows an embodiment of the aircraft in which it is provided with intubated vertical propellers with only maneuver bidirectional propellers.

A very simple embodiment designed for aircrafts with low production cost or for low scale radio controlled versions, but which still retain a good maneuvering ability, can be obtained by the configuration of the system of propulsion and maneuvering only from the vertical propellers 3 which are in the bidirectional embodiment, the horizontal transverse bidirectional propellers 24a and the horizontal intubated propellers 4, which have the same dimensions and structural characteristics as the propellers 24a. By giving up vector nozzles 5 it produces an aircraft with a remarkable symmetry and aerodynamic characteristics virtually identical regardless of the horizontal direction of travel—FIG. 29.

The aircraft can be declined in several variants with very different uses.

Figure 30:
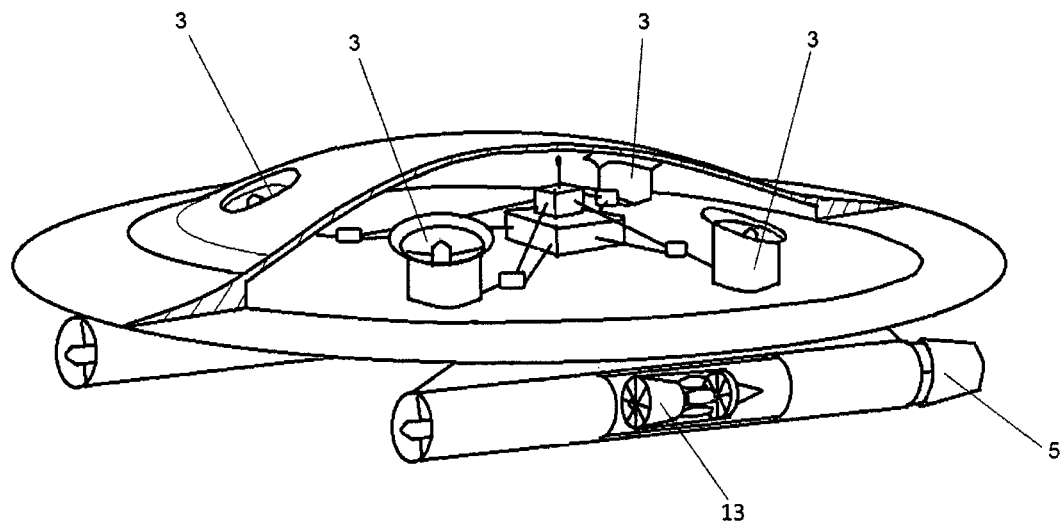
FIG. 30 shows the embodiment of the aircraft in which the horizontal propulsion is performed with turbojet engines.

First, to increase the range of the aircraft in the prior art horizontal thrusters is necessary to replace the horizontal electric power trains with heat engines. Thus, either the electric engines of the horizontal intubated propellers will be replaced with conventional heat piston engines or with Wankel type engines, either with a thermal-electric hybrid drive or the horizontal intubated propellers will be replaced entirely with turbo-jet engines—FIG. 30.

Thus, the number of on-board accumulators decreases substantially, making room for the storing of liquid fuel. Although one can use heat engines for the vertical intubated propellers 3, it is preferable that their engines be electric, because they have a small mass, a very short time response and high reliability. Given the fact that the vertical intubated propellers 3 are used at maximum only for a limited period of time for the takeoff and landing phases, the electric achievement version is preferable.

Instead, for driving the horizontal propellers 4 is preferable to use heat engines because the liquid fuel has a much higher value of stored energy per mass unit (WI kg), and during the flight the fuel is consumed thus easing the aircraft and taking also into account the fact that the cruising flight is conducted under thrust I weight subunit, in this way a substantial increase in the range of the aircraft is achieved. In addition, the types of heat engines and mostly the use of jet engines can provide high travel speeds to be achieved, including supersonic.

For aircrafts with lower speed, heat engines can be conventional with piston, but especially rotary Wankel type, which are particularly suitable for their low weight and low vibration. At the moment there is a big enough range of Wankel engines typically used in the UAV appliances sector.

Figure 31:
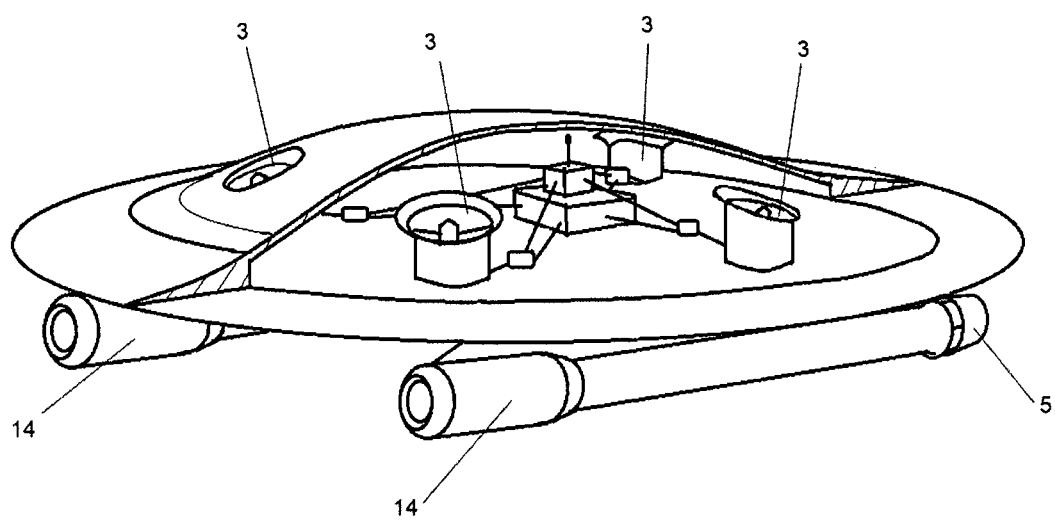
FIG. 31 shows the embodiment of the aircraft in which the horizontal propulsion carried out with pulse jet engines.

A particular variant of jet engine is the pulsoreactor engine—FIG. 31. It provides a lightweight, low specific fuel consumption and high reliability. This engine variant might be used mainly for average travel speeds.

Figure 32:
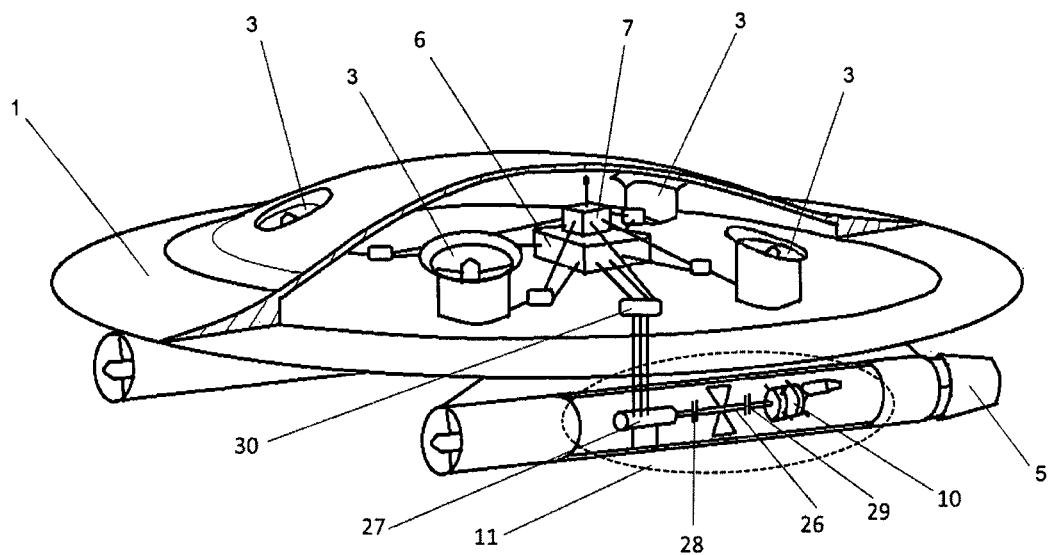
FIG. 32 shows the embodiment of the aircraft with horizontal hybrid propulsion where the heat engine is either a classical one of piston type or a rotary engine Wankel.

One excellent engine suitable for the needs of an average speed aircraft is the hybrid, thermal-electric 11. Thus each of heat engines 10 of the horizontal intubated propellers will be coupled on the same shaft of the propeller 26 with an electric generator-motor-27 thus performing a hybrid power train assembly—FIG. 32. The electric generator-motor will be connected to the propeller through a clutch 28, and the heat engine will in turn be coupled to the propeller through another clutch 29. Thus the intubated propeller can be set in motion either by the heat engine or by the electric one, or by both at the same time according to the flight mode. During the operation of heat engine 10, when both clutches are engaged, it simultaneously moves the axis of the electric motor-generator 27, which can operate in the first part of the flight as a generator, recharging electric accumulators 6 on board. When electricity abound generator passes through a control device 30 as a motor entailing the propeller thus helping to ease the burden of the heat engine or helping with it to increase traction. When the amount of electricity drops to a predetermined threshold that would ensure simultaneously both the energy required for flight maneuverability and to land the machine from that flight altitude, the engine will switch back to a generator mode recharging batteries to full capacity. Thus, during the flight there will be a sufficient amount of electricity on board to ensure all flight maneuvers that require the contribution of electric motors and also the landing maneuver in all conditions, including an emergency. To this end, the control and management module of the flight 7 will be programmed to manage the operation mode of the motor-generator so as to ensure these requirements. The two clutches offer the possibility that the aircraft be powered in some cases either by the heat engine only either by the electric motor only. For smaller aircrafts the two clutches may lack, the heat-engine/electric generator engine assembly permanently operating jointly.

Figure 33:
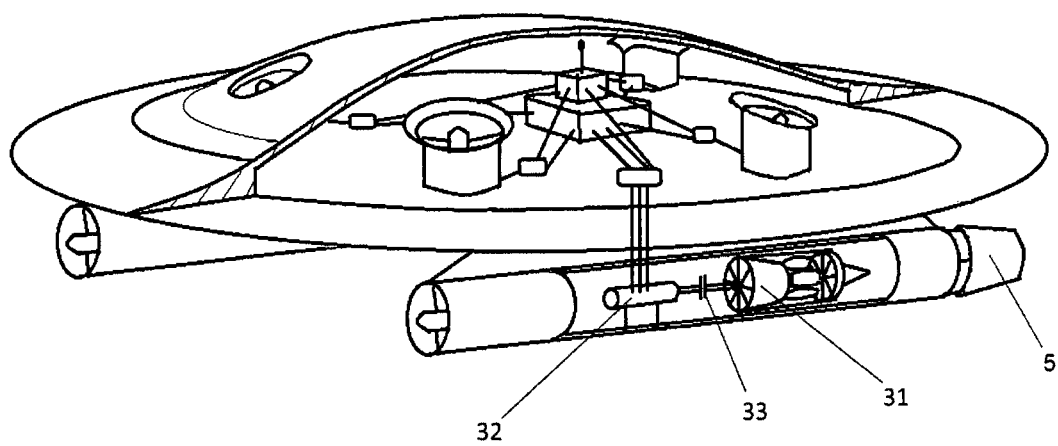
FIG. 33 shows the embodiment of the aircraft with horizontal hybrid propulsion where the thermal engine is turbojet in the building embodiment of turboshaft type.

For hybrid devices intended for higher speeds, piston heat engines or Wankel type engines may be replaced by turboshaft type turbojets 31, coupled spindle with electric motor I generators operating at high speeds regimes 32—FIG. 33. The shaft of the engines can be shared or the two axes of the heat engine and the electric one can be coupled through a clutch 33.

Figure 34:
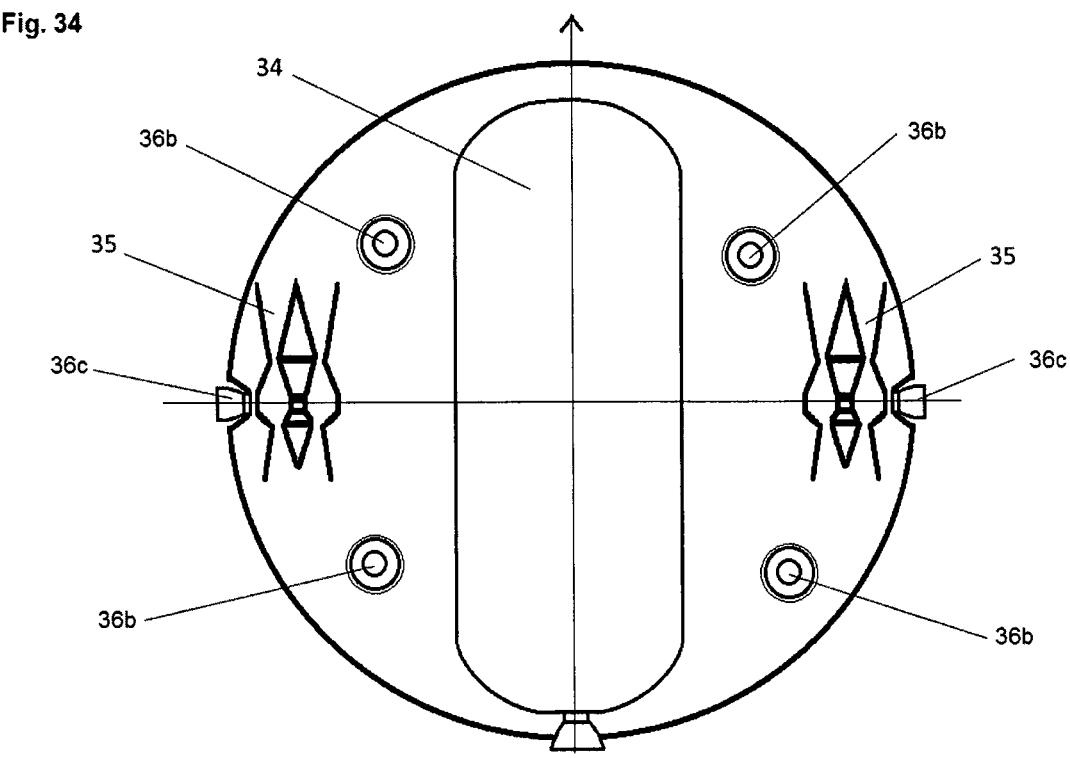
FIG. 34 shows the embodiment of the aircraft for very high altitudes flight fitted with range rocket engine and ramjet engines for horizontal propulsion and rocket engines with frequent restart mode for vertical and lateral maneuvers.

For the aircrafts intended for high speeds and altitudes there can also be used range rocket engines (boosters) 34 for the takeoff and acceleration phase, and instead of horizontal intubated propellers 4 ramjets or scramjets 35—FIG. 34. Also for translation movements and other maneuvers of the aircraft, the vertical intubated propellers 3 and the transversal one 19 will be replaced by restartable rocket engines 36b and 36c respectively. Range rocket engines 34 are designed to carry the aircraft to the speed and altitude required to start ramjets, and after the latter take over the task of propulsion, the additional range rocket engines (boosters) will be enlarged. To maneuver, the ramjets 35 are provided with finned vector nozzles typical for rocket engines.

Figure 35:
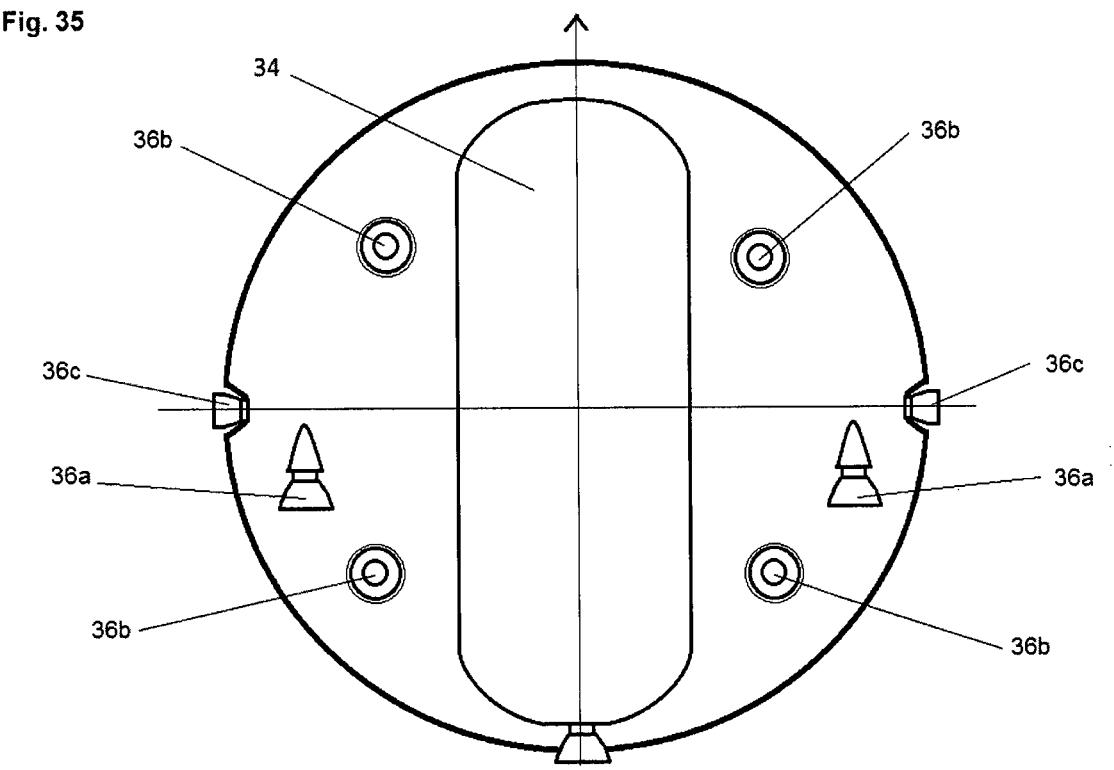
FIG. 35 shows an embodiment version of the aircraft for suborbital altitudes flight provided with a range rocket engine for takeoff and rocket engines for horizontal propulsion and rocket engines with frequently restartable mode for vertical and lateral maneuvers.
Figure 36:
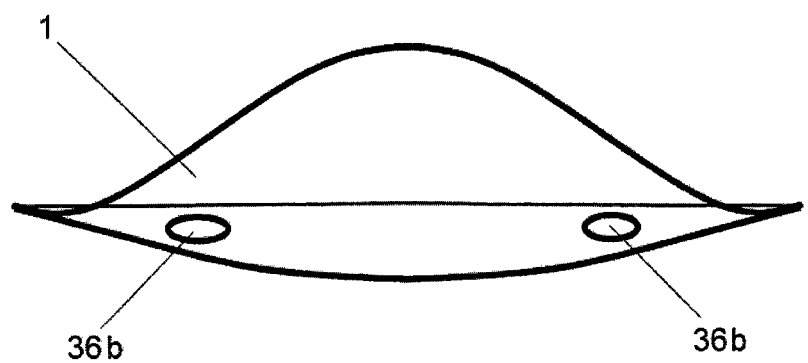
FIG. 36 shows an example of profile for suborbital aircraft with the soffit profiled for re-entering the atmosphere.

For suborbital flights you can use a variant equipped with rocket engines only. In this case ramjets 35 will also be replaced by restartable rocket engines 36a with vector nozzles. Thus for propulsion and maneuvering during cruising flight the aircraft will use rocket engines 36a with steerable jet and for maneuvers amending the trajectory vertical rocket engines 36b and the transversal horizontal ones 36c-FIG. 35. In this configuration, the aircraft can be used for suborbital flights, because it can have a proper discoid shape—FIG. 36. For braking and precise positioning of the aircraft there can be used response and control systems typical to space crafts reaction control system—RCS.

To achieve a suborbital flight, the aircraft will be provided for the takeoff and acceleration phase range with rockets 34 and it will be launched either directly from an vertical position as the conventional space crafts, either horizontally using a tilted ramp that can be further provided with an electromagnetic carrier cart or using a carrier aircraft at a higher altitude.

The stage of suborbital flight will be achieved by periodically changing the angle of incidence, the aircraft bouncing from time to time in the upper denser atmosphere, thus making a suborbital navigation in jumps at an altitude of about 100 km. Changing the angle of incidence can be done either with vertical restart rockets 36b or using the nozzles of the horizontal restart rockets with vector nozzles 36a. For the hot gases to not affect the housing of the aircraft, rocket engines with steerable nozzles type of aerospike type straight or tapered can be used.

Braking to reenter the dense atmosphere of a suborbital version aircraft will be made using the soffit and the vertical rockets 36b. The soffit by its shape will achieve the aerodynamic braking and heat dissipation resulting from friction with the air and the vertical rocket engines 36b will slow down the aircraft and will control the angle and the position of the aircraft at its entry into the atmosphere. After slowing the aircraft down to a speed corresponding to the last stage of the landing phase parachutes will be used.

Figure 37:
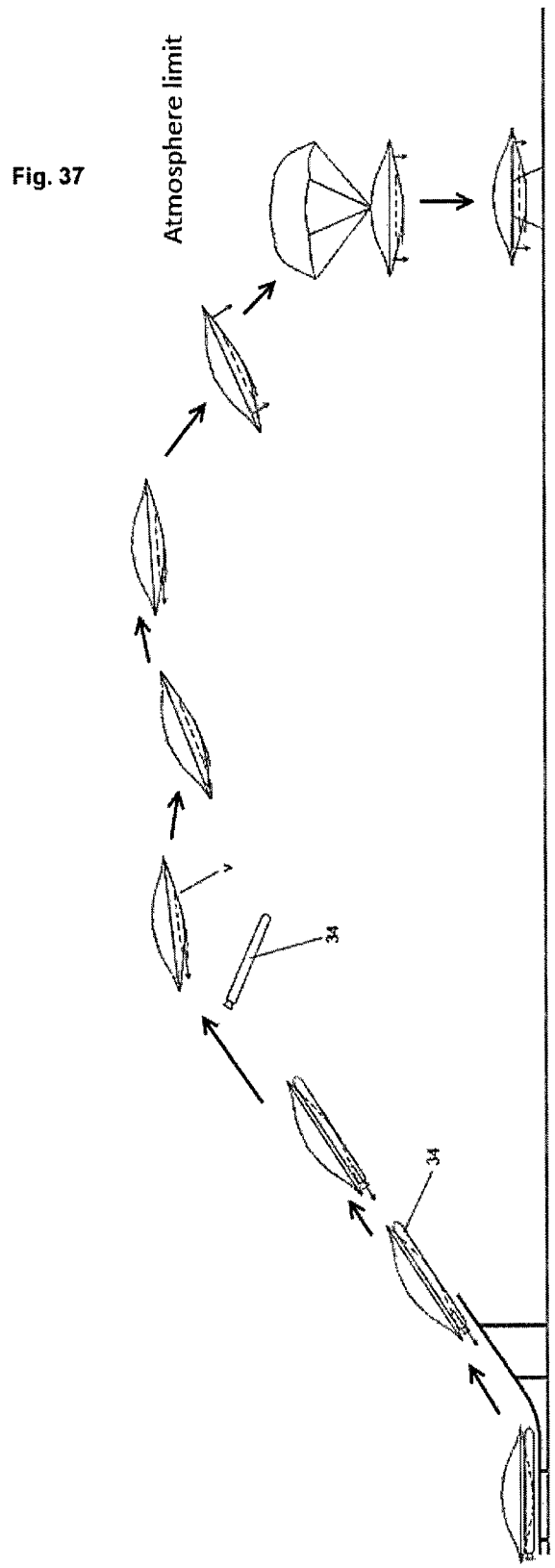
FIG. 37 illustrates the main phases of the suborbital flight process.

The flight sequence in the version with the launch of the aircraft from the tilted ramp is illustrated in FIG. 37.

Figure 38:
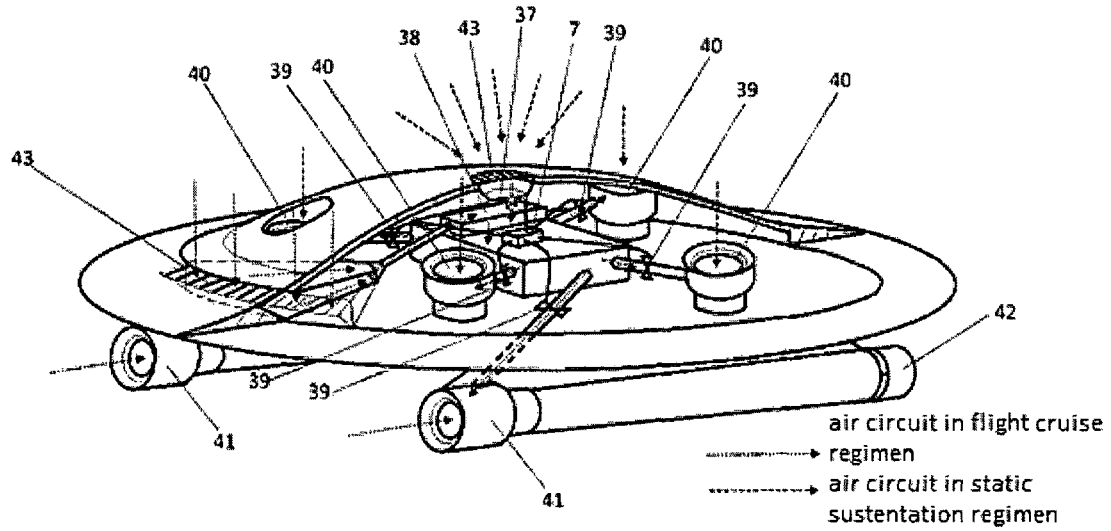
FIG. 38 shows the embodiment of the apparatus with air amplifiers (Coanda ejectors)

A particular embodiment is the one obtainable by replacing all intubated propellers and other maneuver devices with Coanda ejectors powered by an air Compressor 37 on board—FIG. 38. Thus there will be one engine that operates the compressor, which in turn powers the Coanda ejectors of the aircraft by means of a controllable pressure vessel. Thus the lifting, propulsion and maneuvering system of the aircraft will consist of the following components:

air compressor 37
pressure vessel 38
adjustable valves 39
vertical ejectors 40
horizontal propulsion ejectors 41
vector nozzles of the horizontal ejectors 42
air intakes 43
optional—transverse three dimensionally steerable ejectors or provided with vector nozzles.

The functionality of this embodiment is the following: the air compressor 37 is fed by air intakes 43 and compresses the air which enters into the pressure vessel 38 that feeds it if necessary so that the pressure of compressed air does not fall below necessary to enable the ejectors. The control and flight management 7 orders the distribution of compressed air via adjustable vanes 39 to the vertical Coanda ejectors 40 and the horizontal ones 41. The adjustable valves 39 are designed to provide air under pressure to the ejectors according to the order received from module 7, the valves fulfilling a similar role to that of speed governors 8 for the engines of the intubated propellers of the embodiments provided with electric motors.

Figure 39:
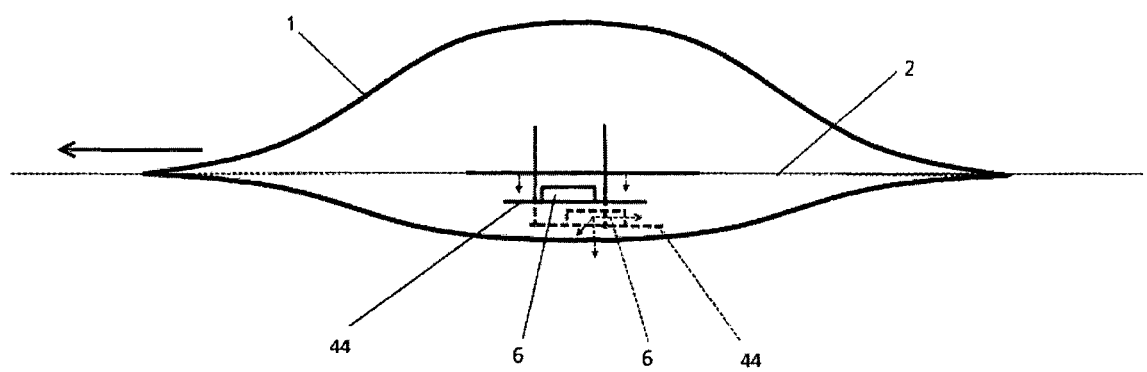
FIG. 39 is an illustration of how the balance of the apparatus works by a three-dimensional move of some components within the load-bearing body.

The flight procedure is the same as that of the embodiments with intubated propeller or jet. During the flight the aircraft can maintain or alter the center of gravity by the vertical movement of some greater mass components that are placed on the vertical axis of the aircraft or in its proximity, such as for example the group of electric accumulators 6. This assembly that can be achieved by placing the respective weight on a mobile support 44 driven in the vertical direction by means of a device that already exists on the market (for example, worm shaft, actuators, etc.). At the same time, the movable carrier 44 is horizontally slidable in the longitudinal or transverse directions, so that the center of gravity can be moved three-dimensionally depending on the needs balance of the apparatus—FIG. 39.

Figure 40:
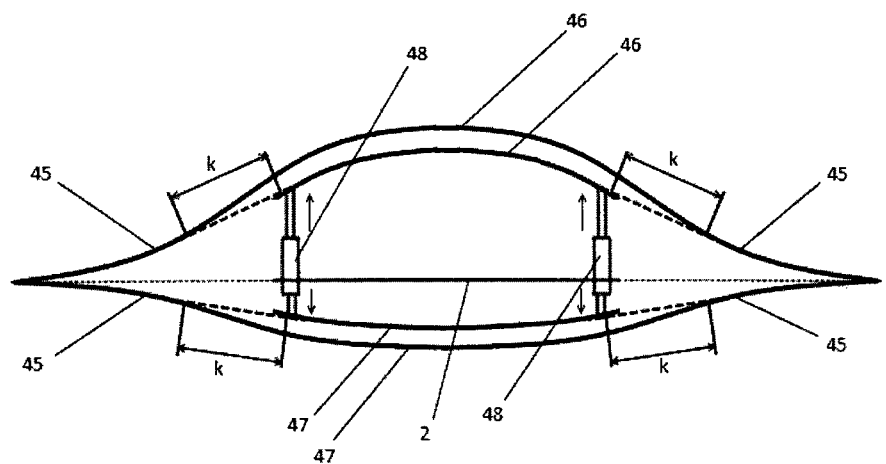
FIG. 40 shows a supporting body with changeable profile.
Figure 41:
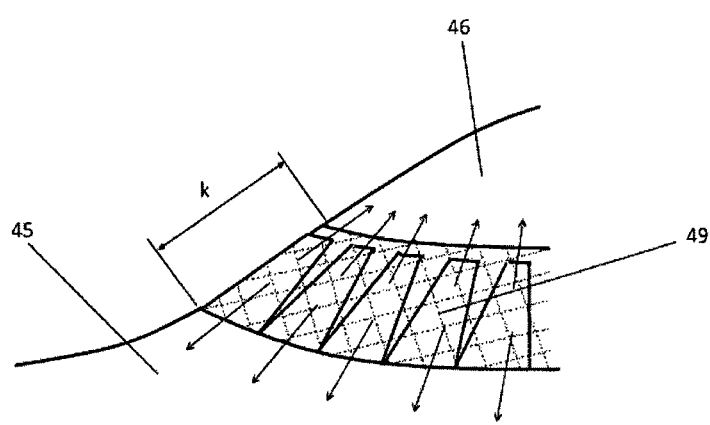
FIG. 41 shows a detail of joining the board with a mobile cap.

The symmetrical shape of the aircraft also allows the possibility of building a bearing body with modifiable form. This would allow an optimum adaptation of the aircraft to different modes of speed and altitude. In this respect the modifiable bearing body is made up of its fixed board 45, the upper surface of the spherical cap 46 the spherical cap of the soffit 47 and the actuarial mechanism of the two caps 48. The actuarial mechanism of caps 48 is fixed to the inner platform 2, and it can simultaneously or independently move up or down the two caps, thus changing the shape of the outer side or of the soffit—FIG. 40. In order to obtain a proper curvature the caps will slide under the two planes of the board. In order to achieve a smooth transition from the surface of the caps to that of the board, the latter will be made of an elastically deformable material with a shape such as that of FIG. 41 with the ends cut in a zigzag. The caps will be made of rigid materials and will slide on the under cut edges of the dashboard. To maintain a fine shape profile, junction (k) of the board and the caps will be covered with expandable material 49 polyester type—polyurethane, copolymer Spandex type, Lycra, Elastan or Darlexx or other materials with similar properties.

As an added safety the aircraft will be equipped with a landing parachute triggered automatically in the event of problems because of which the landing with the means on board can no longer be performed safely.

The invention claimed is:

1. An aircraft of an aerodyne type with vertical takeoff and landing capability comprising:
an aerodynamic, symmetrical circular body (1),
at least four vertical propellers (3a), (3b), (3c), (3d) arranged symmetrically to a central vertical axis of the body (1) and also to a predetermined flight axis and to a transverse axis of the body (1), a first set of propellers (3a) and (3c) of the at least four vertical propellers having a same direction of rotation, and a second set of propellers (3b) and (3d) of the at least four propellers having a same direction of rotation opposite to the direction of rotation of the first set of propellers (3a) and (3c), at least two horizontal shrouded propellers (4) with opposite rotation directions, placed symmetrically parallel to the predetermined flight axis and on either side of the predetermined flight axis:
a landing gear (9), which aims to promote contact between the aircraft and ground, wherein the aircraft comprises:
an inner stiffening platform (2) located on a chord of an aerodynamic profile which supports components of the aircraft;
the at least two horizontal shrouded propellers and the at least four vertical propellers being bidirectional and configured to rotate in both directions being driven by restartable thermal engines, electric engines, or a combination thereof;
a plurality of vectored nozzles (5) each having a jet, one for each horizontal shrouded propeller (4), the plurality of vectored nozzles (5) providing a vectored orientation of the jets of the horizontally shrouded propellers (4) for yaw, roll, pitch and braking of the aircraft;
a power supply (6) including electric accumulators or, one or more fuel cells, the power supply (6) configured to provide electricity necessary to operate all the engines and electrical and electronic devices on board;
an electronic control and management of flight module (7);
the aircraft driven by a pilot on board the aircraft or by a pilot seated on the ground by a radio remote control (10).

2. The aircraft according to claim 1 wherein the body (1) has an aerodynamic profile defined by an arbitrary frame s(x) in a unit chord [0,1] and a positive differentiable function g(x) on an interval, which is a half-thickness of the aerodynamic profile, the aerodynamic profile meeting in any vertical section the following two conditions:
i). a semi-thickness is tangential to a skeleton in a leading edge and a run edge; and
ii). the aerodynamic profile is bidirectional and symmetrical to an axis perpendicular to a middle of the chord $s(x)=s(1-x)$ and $g(x)=g(1-x)$.

3. The aircraft according to claim 1 further comprising:
a bidirectional transverse propeller (19) positioned within the body (1) and placed in a horizontal plane perpendicular to the predetermined flight axis passing through the axis of symmetry of the aircraft, the bidirectional transverse propeller (19) including:
a plurality of vector nozzles (20) and (21), and being placed in a tube provided in an area adjacent the first vector nozzle of the first and second vector nozzles with a valve or a hatch configured to open by depression of the tube by providing a sufficient amount of intake air, the intake air ejected at a second end of the tube opposite the first end.

4. The aircraft according to claim 1 further comprising:
two three-dimensionally steerable individual propellers (22) and (23) arranged symmetrically in a horizontal plane from a center of the body (1) on the transverse axis and perpendicular to the predetermined flight axis, positioned laterally outside the body (1).

5. The aircraft according to claim 1 further comprising:
two three-dimensional steerable rocket engines arranged symmetrically in a horizontal plane from a center of the body (1) on the transverse axis perpendicular to the predetermined flight axis, positioned laterally outside the body (1).

6. The aircraft according to claim 1 further comprising:
a maneuvering system, the maneuvering system including:
two horizontal bidirectional propellers (24*a*) placed in a horizontal plane arranged symmetrically parallel to the transverse axis, a first horizontal bidirectional propeller of the two horizontal bidirectional propellers positioned on a first lateral side of the transverse axis; and
a second horizontal bidirectional propeller of the two horizontal bidirectional propellers positioned on a second lateral side of the transverse axis.

7. The aircraft according to claim 1 further comprising:
a restartable rocket engine (r) paired with an engine of a propeller.

8. The aircraft according to claim 1 wherein the electronic control and flight management module (7) comprises:
two pilot units, a first pilot unit (15) of the two pilot units managing a hovering position of the aircraft in a quadcopter mode obtained by using the at least four vertical propellers (3), and a second pilot unit (16) of the two pilot units configured to manage command of the at least two horizontal propellers (4) and the plurality of vector nozzles (5), the first pilot unit and the second pilot unit being located in a center of symmetry of the aircraft and positioned along the predetermined flight axis and mounted integrally, one upon the other, on a mobile support (17) which can be inclined to the horizontal plane of the aircraft in the direction of the flight axis or any other direction with a changeable angle.

9. The aircraft according to claim 1 wherein, in order to perform flight maneuvers, two pairs of bidirectional horizontal maneuvering propellers (24*a*) and (24*b*) and the at least four vertical propellers (3) are actuated.

10. The aircraft according to claim 1 wherein the body (1) has a changeable shape, the body comprising:
a fixed board (45), a first spherical cap (47) of a soffit, a second spherical cap (46) of an upper surface, and an actuator of the first spherical cap and the second spherical cap fixed to the inner platform (2), the actuator configured to move the first spherical cap and the second spherical cap concurrently or independently up and down to change the shape of the upper surface or a shape of the soffit, the first spherical cap and the second spherical cap configured to slide under the fixed board; wherein
a contact portion (k) is covered on an outside of the body with an extendable material.

11. The aircraft according to claim 10 wherein the fixed board is made from an elastically deformable material with a plurality of zigzag cut edges.

12. The aircraft according to claim 1 further comprising:
a maneuvering system in a horizontal plane, the maneuvering system including:
two pairs of bidirectional horizontal maneuvering propellers (24*a*) and (24*b*) placed inside the body (1), a first pair (24*a*) of the two pairs of bidirectional horizontal maneuvering propellers being arranged horizontally symmetrically parallel to the transverse axis; and a second pair (24*b*) of the two pairs of bidirectional horizontal maneuvering propellers being placed in a same horizontal plane symmetrically parallel to the predetermined flight axis.

13. The aircraft according to claim 12 further comprising:
four vertical maneuver propellers (25) arranged vertically and perpendicular to the predetermined flight axis on the transverse axis, each of the four vertical maneuver propellers (25) being placed in a proximity of each of the bidirectional horizontal maneuvering propellers (24).

14. The aircraft according to claim 13 wherein the four vertical maneuver propellers (25) are arranged in an X, and the four vertical maneuver propellers have centers of rotation on a same radius as the at least four vertical propellers (3).

15. A method of operating an aircraft of an aerodyne type with vertical takeoff and landing capability comprising:
tilting towards a flight direction of a control and flight management module (7) with a desired angle (a) related to an inner platform (2) of the aircraft to achieve an angle of incidence of the aircraft;
orienting a plurality of vector nozzles (5) in a same horizontal direction to achieve a yaw movement during flight;
orienting the plurality of vector nozzles (5) vertically in contrary directions to achieve a roll movement;
orienting the plurality of vector nozzles (5) in a same vertical direction to achieve a pitch movement; and
transitioning to a cruise flight by increasing a thrust of a plurality of horizontal propellers (4) until a body (1) of the aircraft generates a lifting force greater than a weight of the aircraft weight.

16. The method according to claim 15, further comprising:
braking the aircraft by increasing the angle of incidence of the aircraft by at least one of:
a simultaneous vertical upward movement of the plurality of vector nozzles (5);
reversing a direction of rotation of a plurality of horizontal propellers (4) or reversing a direction of rotation of a plurality of horizontal maneuver propellers (24*b*).

17. The method according to claim 15, further comprising:
operating a bidirectional propeller (19) in a first direction or an opposite second direction while maintaining a plurality of nozzles (20) and (21) in a neutral position to achieve a translation movement in a horizontal plane;
operating the bidirectional propeller (19) in the first direction or the second direction and orienting the plurality of nozzles (20) and (21) vertically at equal angles, but oriented in opposite directions, to achieve the roll movement;
operating the bidirectional propeller (19) in the first direction or the second direction and orienting the plurality of nozzles (20) and (21) horizontally at equal angles, but oriented in opposite directions, to achieve the yaw movement; and
orienting the plurality of vector nozzles (20) and (21) and a transverse bidirectional propeller (19) forward to provide a braking maneuver.

18. The method according to claim 15, wherein the aircraft is provided with two individual three-dimensionally steerable propellers (22) and (23) or two rocket engines, symmetrically disposed in a horizontal plane of the body (1)

on a transverse axis and perpendicular to an axis of flight and positioned laterally outside a body (1) of the aircraft, the method further comprising:

operating one of a first propeller (22) or a second propeller (23) with each of the first propeller and the second propeller in a neutral position to achieve a translational motion in a horizontal plane;

concomitantly operating the first propeller and the second propeller oriented in a vertical plane in a desired direction to achieve a roll movement in a first direction or a second direction opposite the first direction;

concomitantly operating the first propeller and the second propeller oriented in the horizontal plane in a desired direction to achieve a turning movement in the first direction or the second direction;

orienting the first propeller and the second propeller vertically in a same direction and with a same angle to achieve a vertical translation movement; or orienting the first propeller and the second propeller in a same plan and the same angle in opposite directions of movement to achieve a braking maneuver.

\* \* \* \* \*